United States Patent
Woo et al.

(10) Patent No.: US 12,166,270 B2
(45) Date of Patent: Dec. 10, 2024

(54) ELECTRONIC DEVICE PROVIDED WITH 5G ANTENNA

(71) Applicant: LG ELECTRONICS INC., Seoul (KR)

(72) Inventors: Seungmin Woo, Seoul (KR); Ilnam Cho, Seoul (KR); Yoonoh Yang, Seoul (KR); Sangwook Lee, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 326 days.

(21) Appl. No.: 17/777,261

(22) PCT Filed: Nov. 15, 2019

(86) PCT No.: PCT/KR2019/015621
§ 371 (c)(1),
(2) Date: May 16, 2022

(87) PCT Pub. No.: WO2021/095934
PCT Pub. Date: May 20, 2021

(65) Prior Publication Data
US 2022/0399634 A1 Dec. 15, 2022

(51) Int. Cl.
*H01Q 1/24* (2006.01)
*H01Q 21/06* (2006.01)
(Continued)

(52) U.S. Cl.
CPC ........... *H01Q 1/243* (2013.01); *H01Q 21/065* (2013.01); *H04B 7/0617* (2013.01); *H04B 7/0413* (2013.01)

(58) Field of Classification Search
CPC ...... H01Q 1/243; H01Q 21/065; H01Q 1/521; H01Q 9/0457; H01Q 15/006;
(Continued)

(56) References Cited

U.S. PATENT DOCUMENTS 7,629,930 B2 * 12/2009 Murch ................ H01Q 9/0421
343/846
8,981,998 B2 * 3/2015 Orime .................. G01S 13/003
343/909
(Continued)

FOREIGN PATENT DOCUMENTS

| KR | 101914526 | 11/2018 |
| KR | 20190036438 | 4/2019 |
| KR | 20190096142 | 8/2019 |

OTHER PUBLICATIONS

Won-Sang Choi, et al., "Isolation Enhancement between Two Dual-Band Microstrip Patch Antennas Using EBG Struction without Common Ground Plane", Mar. 2012, 9 pages.
(Continued)

*Primary Examiner* — Wayne H Cai
(74) *Attorney, Agent, or Firm* — LEE, HONG, DEGERMAN, KANG & WAIMEY

(57) ABSTRACT

Provided is an electronic device provided with an antenna for 5G communication according to the present invention. The electronic device includes an array antenna which is implemented as a multi-layer substrate inside the electronic device and includes a plurality of antenna elements. Each of the antenna elements of the array antenna comprises: a patch antenna disposed on a specific layer of the multi-layer substrate and configured to radiate a signal applied from a feeder line; a first electronic band gap (EBG) element disposed parallel to the patch antenna on the left or right side of the patch antenna; and a second electronic band gap (EBG) element disposed parallel to the patch antenna on the upper or lower side of the patch antenna.

13 Claims, 13 Drawing Sheets

(51) Int. Cl.
*H04B 7/06* (2006.01)
*H04B 7/0413* (2017.01)

(58) Field of Classification Search
CPC .... H01Q 19/005; H01Q 21/28; H01Q 21/061; H01Q 9/0407; H04B 7/0617; H04B 7/0413; H04B 7/04
See application file for complete search history.

(56) References Cited

U.S. PATENT DOCUMENTS

| 2016/0336654 | A1* | 11/2016 | Aoki | H01Q 5/55 |
| 2016/0344093 | A1* | 11/2016 | Tagi | H01Q 1/525 |
| 2018/0342810 | A1* | 11/2018 | Yu | H01Q 15/008 |
| 2019/0089069 | A1* | 3/2019 | Niroo | H01Q 13/10 |
| 2020/0076072 | A1* | 3/2020 | Keyrouz | H01P 1/2005 |

OTHER PUBLICATIONS

PCT International Application No. PCT/KR2019/015621, International Search Report dated Aug. 7, 2020, 4 pages.

* cited by examiner

| Curve Info | max | xdb10Beamwidth(3) |
|---|---|---|
| ——— Array antenna gain (dBi) Two types of EBGs are used | 14.1979 | 24.4825 |
| ▬▬▬ Array antenna gain (dBi) Optimized two types of EBGS sre used | 14.4597 | 24.6127 |

ELECTRONIC DEVICE PROVIDED WITH 5G ANTENNA

CROSS-REFERENCE TO RELATED APPLICATIONS

This application is the National Stage filing under 35 U.S.C. 371 of International Application No. PCT/KR2019/015621, filed on Nov. 15, 2019, the contents of which are all incorporated by reference herein in their entirety.

TECHNICAL FIELD

The present disclosure relates to an electronic device having a 5G antenna. One particular implementation relates to an electronic device having a 5G array antenna operating in a millimeter wave band.

BACKGROUND ART

Electronic devices may be divided into mobile/portable terminals and stationary terminals according to mobility. Also, the electronic device may be classified into handheld types and vehicle mount types according to whether or not a user can directly carry.

Functions of electronic devices are diversified. Examples of such functions include data and voice communications, capturing images and video via a camera, recording audio, playing music files via a speaker system, and displaying images and video on a display. Some terminals include additional electronic game play functions or perform a multimedia player function. Specifically, in recent years, mobile terminals can receive broadcast and multicast signals to allow viewing of video or television programs.

As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. Also, it is expected that in the future, wireless communication systems using 5G communication technology will be commercialized to provide a variety of services. Meanwhile, some of LTE frequency bands may be allocated to provide 5G communication services.

In this regard, the electronic device may be configured to provide 5G communication services in various frequency bands. Recently, attempts have been made to provide 5G communication services using a Sub-6 band below a 6 GHz band. In the future, it is also expected to provide 5G communication services by using a millimeter wave (mmWave) band in addition to the Sub-6 band for faster data rate.

Meanwhile, a 28 GHz band, a 39 GHz band, and a 64 GHz band are being considered as frequency bands to be allocated for 5G communication services in such a mmWave band. In this regard, a plurality of array antennas in the millimeter wave band may be disposed in the electronic device.

In this regard, when a plurality of antenna elements in the mmWave band are disposed for beamforming to define an array antenna, a spacing between the antenna elements may be disposed close to about a half-wavelength for a beam scan angle.

As the spacing between the antenna elements is disposed close to each other as described above, a level of interference between the antenna elements may increase. Accordingly, there is a problem in that the radiation efficiency of the array antenna is lowered and the beam scanning performance is lowered.

DISCLOSURE OF INVENTION

Technical Problem

An aspect of the present disclosure is to solve the above-mentioned problems and other problems. Another aspect of the present disclosure is to provide a structure design method for improving radiation efficiency and reducing a level of interference between antenna elements in a 5G antenna implemented on a multi-layer substrate.

Furthermore, another aspect of the present disclosure is to provide a structure design method for improving radiation efficiency and reducing a level of interference between antenna elements without additional cost in a multi-layer substrate on which a 5G antenna is disposed.

In addition, still another aspect of the present disclosure is to maximize antenna performance through the performance optimization of EBG structures while using the multi-layer substrate and a multi-layer substrate process for manufacturing the antenna as it is.

Moreover, yet still another aspect of the present disclosure is to improve antenna gain and scan angle performance, which are important performances in 5G mmWave.

Solution to Problem

In order to achieve the foregoing or other objectives, an electronic device having an antenna for 5G communication according to the present disclosure is provided. The electronic device may include an array antenna implemented as a multi-layer substrate inside the electronic device, the array antenna including a plurality of antenna elements. Meanwhile, each of the antenna elements may include a patch antenna disposed on a specific layer of the multi-layer substrate and configured to radiate a signal applied from a feeding line; a first electronic band gap (EBG) element disposed in parallel to the patch antenna at a left or right side of the patch antenna; and a second electronic band gap (EBG) element disposed in parallel to the patch antenna at an upper or lower side of the patch antenna.

According to an embodiment, an arrangement form of the second EBG element may be different from that of the first EBG element.

According to an embodiment, the electronic device may further include a transceiver circuit that controls a signal applied to each antenna element of the array antenna to perform beamforming through the array antenna.

According to an embodiment, the first EBG element may further include a first metal strip spaced apart from the patch antenna by a predetermined spacing at the left or right side of the patch antenna and disposed in parallel thereto; and a second metal strip spaced apart from the patch antenna by a predetermined spacing at the left or right side of the patch antenna and disposed in parallel thereto.

According to an embodiment, the first EBG element and the second EBG element may include a plurality of vias configured to connect an upper layer on which the patch antenna is disposed and a ground layer of a multi-layer circuit substrate. In this case, a diameter of at least one via disposed in a layer adjacent to the ground layer among the plurality of vias may be defined to be larger than those of the other vias.

According to an embodiment, a diameter of a via having the largest diameter among the plurality of vias of the first EBG element EBG1 and the second EBG element EBG2 may be defined to be smaller than a width of each metal strip constituting the first EBG element and the second EBG element.

According to an embodiment, the plurality of vias defined in the first EBG element may be disposed on end portions of the first metal strip and the second metal strip.

According to an embodiment, the ground layer corresponding to a region in which the first EBG element is disposed may include a plurality of slots having a specific length and width, which are spaced apart from each other by a predetermined distance.

According to an embodiment, the second EBG element may include a third metal strip spaced apart from the patch antenna by a predetermined spacing at an upper or lower side of the patch antenna and disposed in parallel thereto; and a fourth metal strip spaced apart from the third metal strip at the upper or lower side of the patch antenna and disposed in parallel thereto.

According to an embodiment, the plurality of vias defined in the first EBG element may be disposed on center portions of the third metal strip and the fourth metal strip.

According to an embodiment, each of the antenna elements may further include a slot region from which a ground is removed in the ground layer of the multi-layer substrate corresponding to a central portion of the patch antenna; and a feeding line defined as a metal line having a predetermined length and width and configured to couple a signal to the patch antenna through the slot region.

According to an embodiment, the first EBG elements may be disposed at both left and right sides of the patch antenna, and the second EBG element may be disposed at both upper and right sides of the patch antenna. In this case, a feeding line that supplies a signal to the patch antenna may be disposed under the ground layer of the multi-layer substrate, and a signal transmitted through the feeding line may be coupled to the patch antenna through a slot region disposed in the ground layer.

According to an embodiment, the array antenna may be configured as a one-dimensional array antenna such that a predetermined number of antenna elements are disposed in one axial direction to perform beamforming in the one axial direction. In this case, the array antenna may be configured with vias disposed on end portions of a first metal strip and a second metal strip in an axial direction in which the array antenna is disposed. Meanwhile, the first metal strip and the second metal strip may be disposed at substantially the same spacing from adjacent patch antennas.

According to an embodiment, the array antenna may be configured as a two-dimensional array antenna in which M antenna elements in one axial direction and N antenna elements less than the M in the other axial direction are disposed. In this case, a first EBG element having vias may be disposed on end portions of a first metal strip and a second metal strip in the one axial direction. Meanwhile, the first metal strip and the second metal strip may be disposed at substantially the same spacing from adjacent patch antennas.

According to an embodiment, in the array antenna, a second EBG element having vias may be disposed in center portions of a third metal strip and a fourth metal strip in the other axial direction. In this case, a first EBG element in which a plurality of vias are disposed on end portions of the first metal strip and the second metal strip in an axial direction in which the array antenna is disposed may be disposed. Meanwhile, the third metal strip may be disposed to be spaced apart from the patch antenna by a predetermined interval, and the fourth metal strip may be disposed to be spaced apart from the third metal strip by a spacing less than the predetermined spacing.

According to an embodiment, the electronic device may further include a baseband processor connected to the transceiver circuit and configured to control the transceiver circuit so as to perform beamforming and multi-input multi-output (MIMO) through a plurality of array antennas disposed at different positions of the electronic device.

According to an embodiment, the plurality of array antennas may include first to fourth array antennas disposed at different positions of the electronic device in a state of being rotated by substantially 90 degrees with respect to each other. In this case, when the quality of a first signal received through the first array antenna is less than or equal to a threshold value, the baseband processor may control the transceiver circuit to receive a second signal through a second array antenna rotated by substantially 90 degrees with respect to the first array antenna.

Advantageous Effects of Invention

According to the present disclosure, through different types of EBG structures at upper/lower sides and left/right sides of the patch antenna, the electronic device may operate to optimize the directionality of an E-field formed in the patch antenna, thereby improving antenna gain and antenna scan angle.

Furthermore, according to the present disclosure, a surface wave generated along a surface of a dielectric around the patch antenna may be reduced to increase a signal component radiated to a free space, thereby improving antenna efficiency.

In addition, according to the present disclosure, interference between antennas may be reduced through different types of EBG structures to improve radiation pattern, thereby extending scan angle.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

MODE FOR THE INVENTION

Figure 1A:
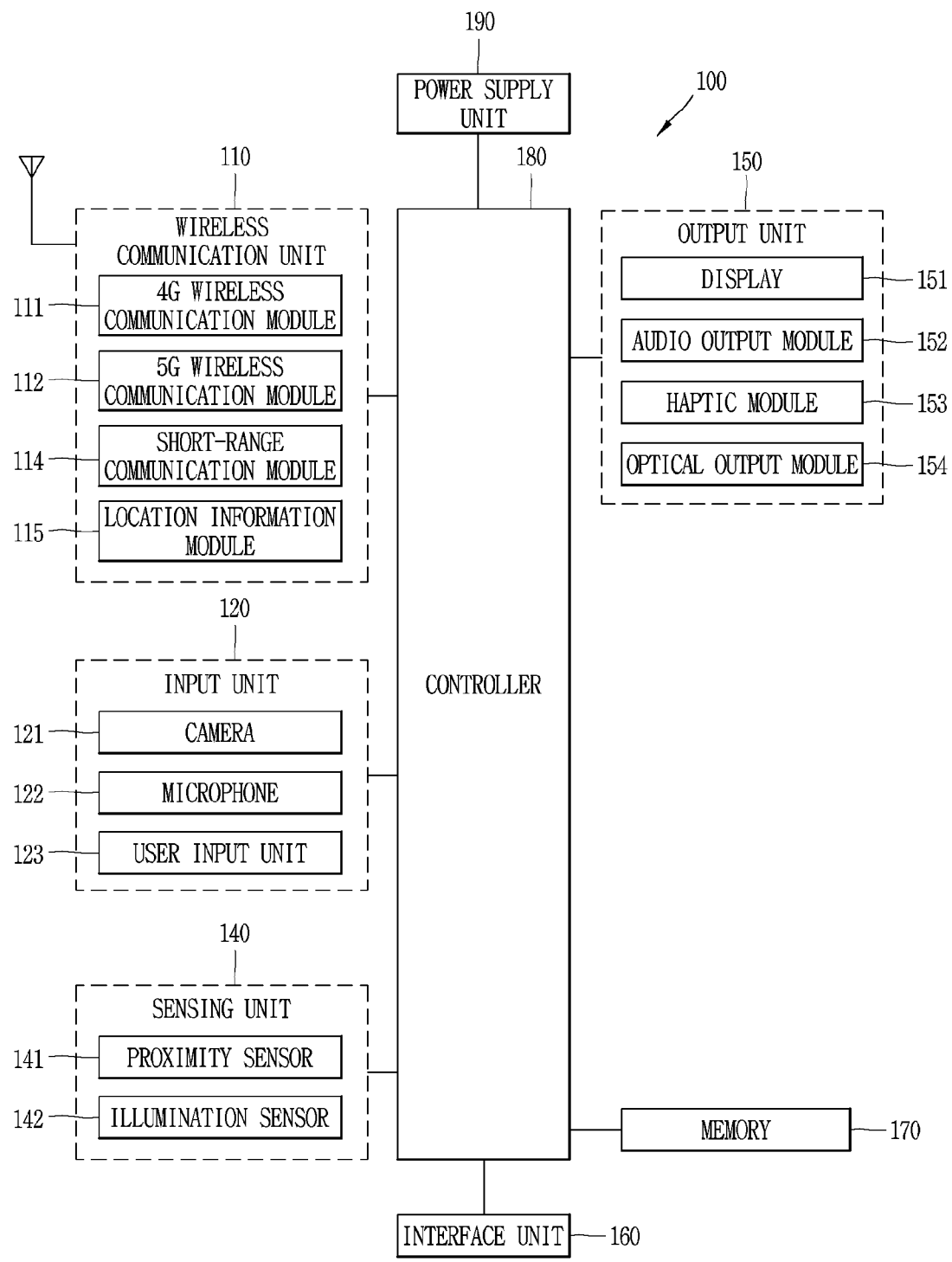
FIG. 1A is a block diagram of an electronic device in accordance with one exemplary implementation of the present disclosure.

Hereinafter, preferred embodiments of the present disclosure will be described in detail with reference to the accompanying drawings, and the same or similar elements are designated with the same numeral references regardless of the numerals in the drawings and redundant description thereof will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

In addition, herein, with respect to the meaning of "substantially", the meaning of "substantially the same" means that a physical quantity between two different elements, such as a distance, a direction, or an angle, is the same.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
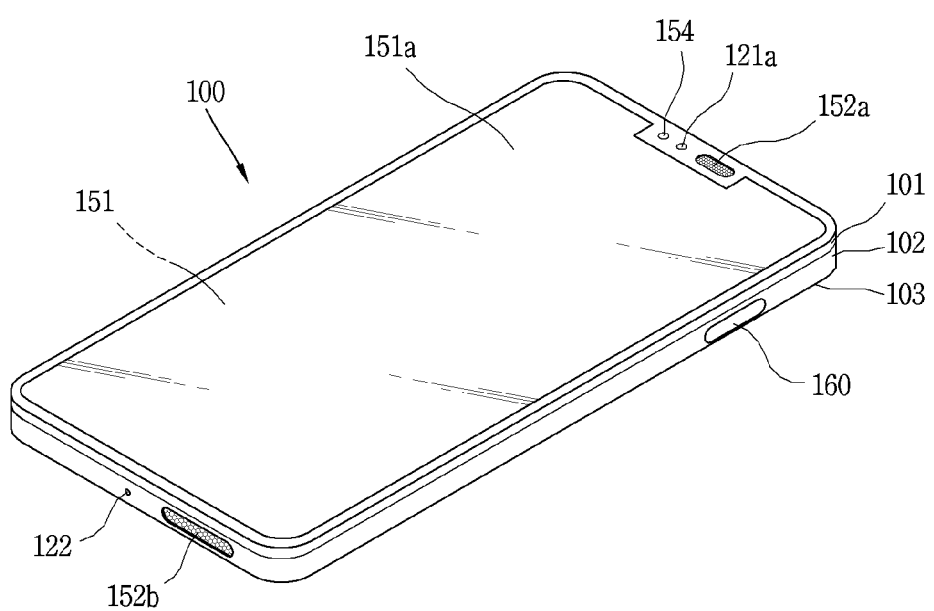
FIGS. 1B and 1C are conceptual views illustrating one example of an electronic device, viewed from different directions.
Figure 1C:
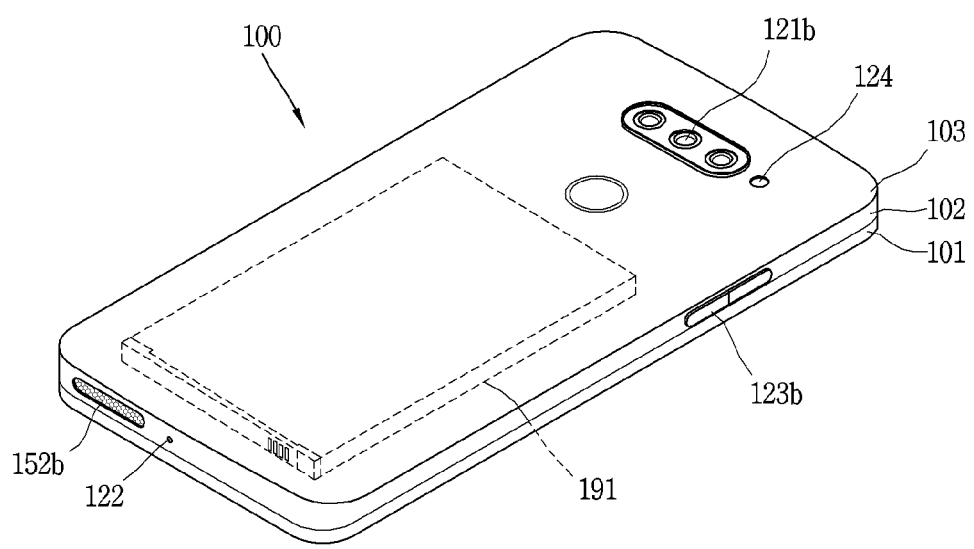

Referring to FIGS. 1A to 1C, FIG. 1A is a block diagram of an electronic device in accordance with one exemplary implementation of the present disclosure, and FIGS. 1B and 1C are conceptual views illustrating one example of an electronic device, viewed from different directions.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement. Greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for instance, a 4G communication network and a 5G communication network.

The wireless communication unit 110 may include at least one of a 4G wireless communication module 111, a 5G wireless communication module 112, a short-range communication module 113, a location information module 114 and the like.

The 4G wireless communication module 111 may transmit and receive 4G signals to and from 4G base stations through a 4G mobile communication network. At this time, the 4G wireless communication module 111 may transmit one or more 4G transmission signals to the 4G base station. Furthermore, the 4G wireless communication module 111 may receive one or more 4G reception signals from the 4G base station.

In this regard, up-link (UL) multi-input multi-output (MIMO) may be performed by a plurality of 4G transmission signals transmitted to the 4G base station. Furthermore, down-link (DL) multi-input multi-output (MIMO) may be performed by a plurality of 4G reception signals received from the 4G base station.

The 5G wireless communication module 112 may transmit and receive 5G signals to and from 5G base stations through a 5G mobile communication network. Here, the 4G base station and the 5G base station may have a non-stand-alone (NSA) structure. For instance, the 4G base station and the 5G base station may have a co-located structure disposed at the same location within a cell. Alternatively, the 5G base station may be deployed in a stand-alone (SA) structure at a separate location from the 4G base station.

The 5G wireless communication module 112 may transmit and receive 5G signals to and from 5G base stations through a 5G mobile communication network. At this time, the 5G wireless communication module 112 may transmit one or more 5G transmission signals to the 5G base station. Furthermore, the 5G wireless communication module 112 may receive one or more 5G reception signals from the 5G base station.

In this case, a 5G frequency band may use the same band as a 4G frequency band, and it may be referred to as LTE re-farming. Meanwhile, a Sub6 frequency band, which is a range of 6 GHz or less, may be used as the 5G frequency band.

On the contrary, a millimeter wave (mmWave) band may be used as a 5G frequency band to perform broadband high-speed communication. When the mmWave band is used, the electronic device 100 may perform beamforming for communication coverage expansion with a base station.

Meanwhile, regardless of the 5G frequency band, in a 5G communication system, a larger number of multi-input multi-output (MIMO) may be supported to improve transmission speed. In this regard, up-ink (UL) MIMO may be performed by a plurality of 5G transmission signals transmitted to the 5G base station. In addition, DL MIMO may be performed by a plurality of 5G reception signals received from the 5G base station.

Meanwhile, the wireless communication unit 110 may be in a dual connectivity (DC) state with a 4G base station and a 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, when the 4G base station and the 5G base station have a co-located structure, it is possible to improve throughput through inter-CA (Carrier Aggregation). Therefore, in an EN-DC state with the 4G base station and the 5G base station, 4G reception signals and 5G reception signals may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area networks. The short-range communication module denotes a module for short-range communications.

Meanwhile, short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission speed improvement and communication system convergence, carrier aggregation (CA) using at least one of the 4G wireless communication module 111 and 5G wireless communication module 112 and the Wi-Fi communication module 113. In this regard, 4G+WiFi carrier aggregation (CA) may be performed using the 4G wireless communication module 111 and the Wi-Fi communication module 113. Alternatively, 5G+WiFi carrier aggregation (CA) may be performed using the 5G wireless communication module 112 and the Wi-Fi communication module 113.

The location information module 114 is generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless access point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) of the electronic device and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensor unit 140 may typically be implemented using one or more sensors configured to sense internal information of the electronic device, the surrounding environment of the electronic device, user information, and the like. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The electronic device disclosed herein may be configured to utilize information obtained from one or more sensors, and combinations thereof.

The output unit 150 may be configured to output an audio signal, a video signal or a tactile signal. The output unit 150 may include a display module 151, an audio output module 152, a haptic module 153, an optical output unit 154 and the like. The display module 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of those application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The controller 180 may provide or process information or functions appropriate for a user in a manner of processing signals, data, information and the like, which are input or output by the aforementioned components, or activating the application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100, under the control of the controller 180. The power supply unit 190 may include a battery, and the battery may be configured to be embedded in the terminal body, or configured to be detachable from the terminal body.

At least part of the components may cooperatively operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIGS. 1B and 1C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this implementation, the electronic device 100 may include a front case 101 and a rear case 102. Various electronic components may be incorporated into a space formed between the front case 101 and the rear case 102. At least one middle case may be additionally positioned between the front case 101 and the rear case 102.

A display module 151 may be disposed on a front surface of the terminal body to output information. As illustrated, a window 151a of the display module 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed. Meanwhile, part of a side surface of the rear case 102 may be implemented to operate as a radiator.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The electronic device 100 may include a display module 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

The display module 151 is generally configured to output information processed in the electronic device 100. For example, the display module 151 may display execution screen information of an application program executing at the electronic device 100 or user interface (UI) and graphic user interface (GUI) information in response to the execution screen information.

The display module 151 may be implemented using two display devices, according to the configuration type thereof. For instance, a plurality of the displays 151 may be arranged on one side, either spaced apart from each other, or these devices may be integrated, or these devices may be arranged on different surfaces.

The display module 151 may include a touch sensor which senses a touch onto the display module 151 so as to receive a control command in a touching manner. Accordingly, when a touch is applied to the display module 151, the touch sensor may sense the touch, and a controller 180 may generate a control command corresponding to the touch. The content input by the touch method may be a text or numerical value, or a menu item capable of indication or designation in various modes.

In this manner, the display module 151 may form a flexible touch screen along with the touch sensor, and in this case, the touch screen may function as the user input unit 123 (refer to FIG. 1A). Therefore, the touch screen may replace at least part of the functions of the first manipulation unit 123a.

The first audio output module 152a may be implemented in the form of a receiver for transferring voice sounds to the user's ear or a loud speaker for outputting various alarm sounds or multimedia reproduction sounds.

The optical output module 154 may output light for indicating an event generation. Examples of the event generated in the electronic device 100 may include a message reception, a call signal reception, a missed call, an alarm, a schedule notice, an email reception, information reception through an application, and the like. When a user has checked a generated event, the controller 180 may control the optical output module 154 to stop the light output.

The first camera 121a may process video frames such as still or moving images acquired by the image sensor in a video call mode or a capture mode. The processed video frames may be displayed on the display module 151, and stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The controller 180 may use fingerprint information sensed by the finger scan sensor as an authentication means. The finger scan sensor may be installed in the display module 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or implemented on the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, description will be given of implementations of a multi-transmission system and an electronic device having the same, specifically, a power amplifier in a heterogeneous radio system and an electronic device having the same according to the present disclosure, with reference to the accompanying drawings. It should be understood by those skilled in the art that the present disclosure can be embodied in other specific forms without departing from the concept and essential characteristics thereof.

Figure 2:
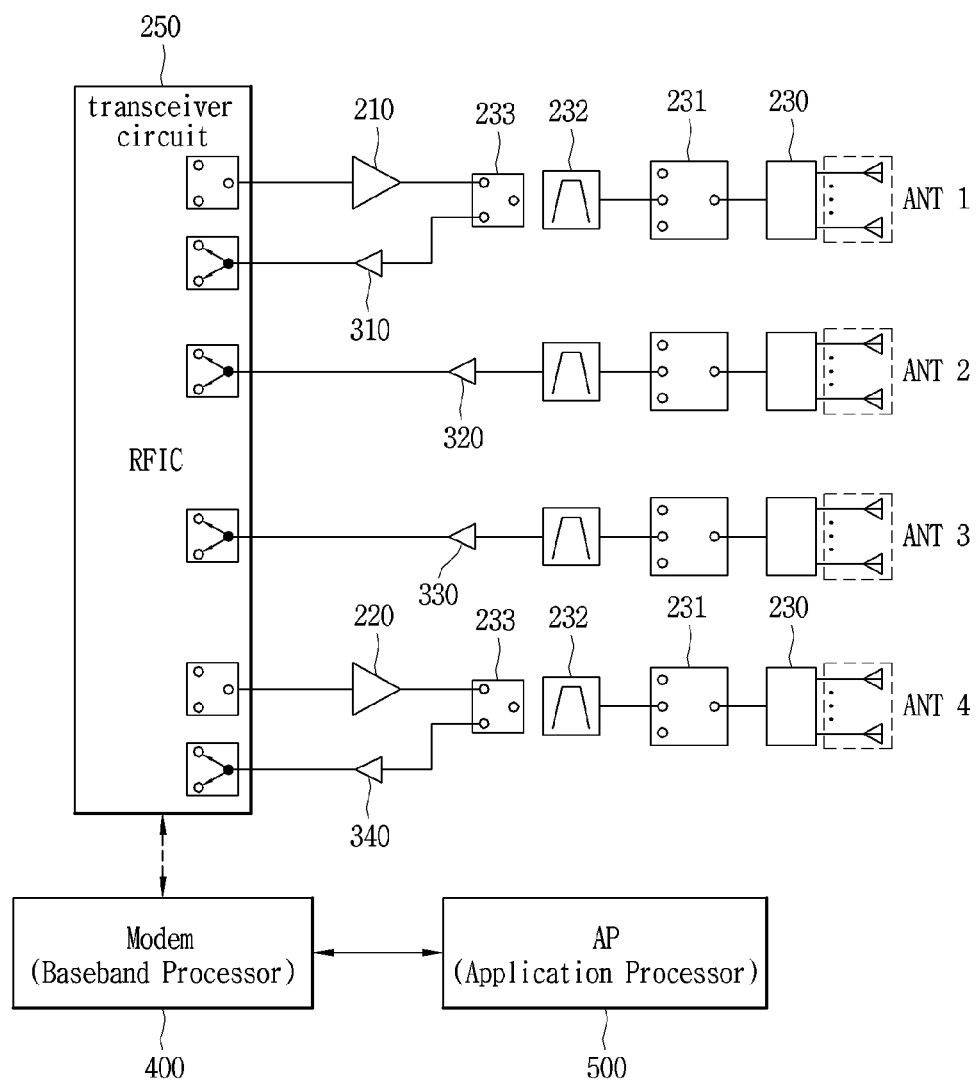
FIG. 2 is a block diagram illustrating a configuration of a wireless communication unit of an electronic device operable in a plurality of wireless communication systems according to an implementation.

FIG. 2 is a block diagram illustrating a configuration of a wireless communication unit of an electronic device operable in a plurality of wireless communication systems according to an implementation. Referring to FIG. 2, the electronic device includes a first power amplifier 210, a second power amplifier 220, and an RFIC 250. In addition, the electronic device may further include a modem 400 and an application processor (AP) 500. Here, the modem 400 and the application processor (AP) 500 may be physically implemented on a single chip, and may be implemented in a logical and functionally separated form. However, the present disclosure is not limited thereto and may be implemented in the form of a chip that is physically separated according to an application.

Meanwhile, the electronic device includes a plurality of low noise amplifiers (LNAs) 410 to 440 in the receiver. Here, the first power amplifier 210, the second power amplifier 220, the RFIC 250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but is not limited thereto, and may also be configured as a 4G/5G separation type according to an application. When the RFIC 250 is configured as a 4G/5G integrated type, it is advantageous in terms of synchronization between 4G/5G circuits, and also there is an advantage capable of simplifying control signaling by the modem 400.

On the other hand, when the RFIC 250 is configured as the 4G/5G separated type, the separated RFIDs may be referred to as 4G RFIC and 5G RFIC, respectively. In particular, when a band difference between the 5G band and the 4G band is large, such as when the 5G band is configured as a millimeter wave band, the RFIC 250 may be configured as a 4G/5G separation type. As such, when the RFIC 250 is configured as a 4G/5G separation type, there is an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 500 is configured to control the operation of each component of the electronic device. Specifically, the application processor (AP) 500 may control the operation of each component of the electronic device through the modem 400.

For example, the modem 400 may be controlled through a power management IC (PMIC) for low power operation of the electronic device. Accordingly, the modem 400 may operate the power circuits of the transmitter and the receiver in a low power mode through the RFIC 250.

In this regard, when it is determined that the electronic device is in an idle mode, the application processor (AP) 500 may control the RFIC 250 through the modem 300 as follows. For example, when the electronic device is in an idle mode, the application processor 280 may control the RFIC 250 through the modem 300, such that at least one of the first and second power amplifiers 110 and 120 operates in the low power mode or is turned off.

According to another implementation, the application processor (AP) 500 may control the modem 300 to provide wireless communication capable of performing low power communication when the electronic device is in a low battery mode. For example, when the electronic device is connected to a plurality of entities among a 4G base station, a 5G base station, and an access point, the application processor (AP) 500 may control the modem 400 to enable wireless communication at the lowest power. Accordingly, the application processor (AP) 500 may control the modem 400 and the RFIC 250 to perform short-range communication using only the short-range communication module 113, even at the expense of throughput.

According to another implementation, when the remaining battery level of the electronic device is above a threshold value, the modem 300 may be controlled to select an optimal wireless interface. For example, the application processor (AP) 500 may control the modem 400 to receive data through both the 4G base station and the 5G base station according to the remaining battery level and the available radio resource information. In this case, the application processor (AP) 500 may receive the remaining battery information from the PMIC, and the available radio resource information from the modem 400. Accordingly, when the remaining battery level and the available radio resources are sufficient, the application processor (AP) 500 may control the modem 400 and the RFIC 250 to receive data through both the 4G base station and 5G base station.

Meanwhile, a multi-transceiving system of FIG. 2 may integrate a transmitter and a receiver of each radio system into a single transceiver. Accordingly, there is an advantage in that a circuit portion for integrating two types of system signals may be eliminated at a RF front-end.

Furthermore, since the front end parts can be controlled by an integrated transceiver, the front end parts may be more efficiently integrated than when the transceiving system is separated by communication systems.

In addition, when separated by communication systems, it may be impossible to control other communication systems as required, or impossible to perform efficient resource allocation since system delay increases due to this. On the contrary, the multi-transceiving system as shown in FIG. 2 may control other communication systems as needed, thereby minimizing system delay due to this, and thus there is an advantage in that efficient resource allocation is possible.

Meanwhile, the first power amplifier 210 and the second power amplifier 220 may operate in at least one of the first and second communication systems. In this regard, when the 5G communication system operates in a 4G band or a sub-6 band, the first and second power amplifiers 1210 and 220 may operate in both the first and second communication systems.

On the contrary, when the 5G communication system operates in a millimeter wave (mmWave) band, the first and second power amplifiers 210, 220 may operate in either the 4G band and the other in the millimeter wave band.

On the other hand, a transmitter and a receiver may be integrated to implement two different wireless communication systems using a single antenna using a dual transmit/receive antenna. Here, 4×4 MIMO may be implemented using four antennas as shown in FIG. 2. In this case, 4×4 DL MIMO may be performed through downlink (DL).

Meanwhile, when the 5G band is a sub-6 band, first to fourth antennas (ANT1 to ANT4) may be configured to operate in both the 4G band and the 5G band. On the contrary, when the 5G band is a millimeter wave (mmWave) band, the first to fourth antennas (ANT1 to ANT4) may be configured to operate in either one of the 4G band and the 5G band. In this case, when the 5G band is a millimeter wave (mmWave) band, a plurality of separate antennas may be individually configured as an array antenna in the millimeter wave band.

Meanwhile, 2×2 MIMO may be implemented using two antennas connected to the first power amplifier 210 and the second power amplifier 220 among the four antennas. In this case, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 210, 220 may operate in the 5G band. Meanwhile, when the 5G communication system is implemented with 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is integrated into the RFIC corresponding to the RFIC 250, and an additional component does not need to be disposed externally, thereby improving component mountability. In more detail, a single pole double throw (SPDT) type switch may be provided in the RFIC corresponding to the controller 250 to select transmitters (TXs) of two different communication systems.

Also, the electronic device operable in the plurality of wireless communication systems according to the present disclosure may further include a phase controller 230, a duplexer 231, a filter 232, and a switch 233.

In a frequency band such as a mmWave band, the electronic device needs to use a directional beam to secure coverage for communication with a base station. To this end, each of the antennas ANT1 to ANT4 needs to be implemented as array antennas ANT1 to ANT4 including a plurality of antenna elements. The phase controller 230 is configurable to control the phase of a signal applied to each antenna element of each of the array antennas ANT1 to ANT4. In this regard, the phase controller 230 may control both the magnitude and phase of a signal applied to each antenna element of each of the array antennas ANT1 to ANT4. Accordingly, since the phase controller 230 controls both the magnitude and phase of the signal, it may also be referred to as a power and phase controller 230.

The duplexer 231 is configured to separate signals in a transmission band and a reception band from each other. In this case, signals in a transmission band transmitted through the first and second power amplifiers 210, 220 are applied to the antennas (ANT1, ANT4) through a first output port of the duplexer 231. On the contrary, a signal in a reception band received through the antennas (ANT1, ANT4) are received by the low noise amplifiers 310, 340 through a second output port of the duplexer 231.

The filter 232 may be configured to pass signals in a transmission band or a reception band and block signals in the remaining bands. In this case, the filter 232 may include a transmission filter connected to the first output port of the duplexer 231 and a reception filter connected to the second output port of the duplexer 231. Alternatively, the filter 232 may be configured to pass only signals in the transmission band or only signals in the reception band according to a control signal.

The switch 233 is configured to transmit only one of the transmission signal and the reception signal. In an embodiment of the present disclosure, the switch 233 may be configured in a single-pole double-throw (SPDT) type to separate a transmission signal and a reception signal in a time division duplex (TDD) scheme. Here, the transmission signal and the reception signal are signals of the same frequency band, and thus the duplexer 231 may be implemented in the form of a circulator.

Meanwhile, in another embodiment of the present disclosure, the switch 233 may also be applicable to a frequency division duplex (FDD) scheme. In this case, the switch 233 may be configured in the form of a double-pole double-throw (DPDT) to connect or block a transmission signal and a reception signal, respectively. On the other hand, the transmission signal and the reception signal may be separated by the duplexer 231, and thus the switch 233 is not necessarily required.

Meanwhile, the electronic device according to an implementation may further include a modem 400 corresponding to the controller. In this case, the RFIC 250 and the modem 400 may be referred to as a first controller (or a first processor) and a second controller (a second processor), respectively. On the other hand, the RFIC 250 and the modem 400 may be implemented as physically separated circuits. Alternatively, the RFIC 250 and the modem 400 may be logically or functionally divided into a single circuit.

The modem 400 may perform control and signal processing for the transmission and reception of signals through different communication systems through the RFIC 250. The modem 400 may be acquired through control information received from the 4G base station and/or the 5G base station. Here, the control information may be received through a physical downlink control channel (PDCCH), but the present disclosure is not limited thereto.

The modem 400 may control the RFIC 250 to transmit and/or receive signals through the first communication system and/or the second communication system at specific time and frequency resources. Accordingly, the RFIC 250 may control transmission circuits including the first and second power amplifiers 210, 220 to transmit 4G or 5G signals in a specific time interval. In addition, the RFIC 250 may control reception circuits including first through fourth low-noise amplifiers 310 to 340 to receive 4G or 5G signals in a specific time interval.

On the other hand, a detailed operation and function of the electronic device having a 5G antennas according to the present disclosure provided with a multi-transceiving system as shown in FIG. 2 will be discussed below.

In a 5G communication system according to the present disclosure, a 5G frequency band may be a higher frequency band than a sub-6 band. For example, the 5G frequency band may be a millimeter wave band, but the present disclosure is not limited thereto and may be changed according to an application.

Figure 3:
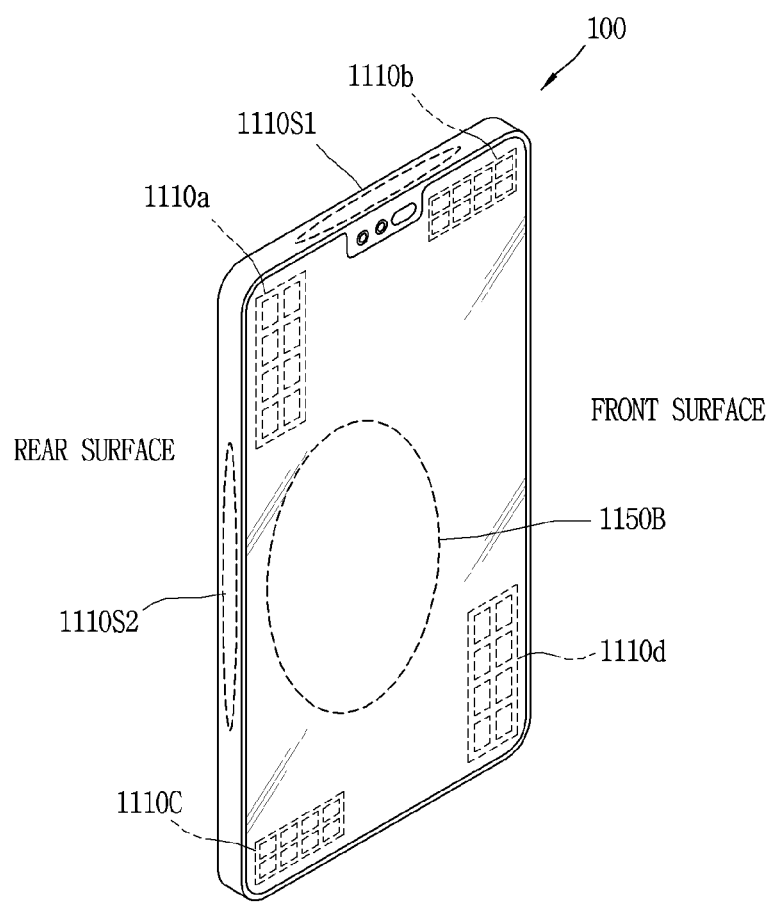
FIG. 3 is an example showing a configuration in which a plurality of antennas of an electronic device according to the present disclosure can be arranged.

FIG. 3 is an example showing a configuration in which a plurality of antennas of an electronic device according to the present disclosure can be arranged. Referring to FIG. 3, a plurality of antennas 1110a to 1110d may be disposed inside the electronic device 100. Here, the plurality of antennas 1110a to 1110d disposed inside the electronic device 100 may be implemented as antennas disposed on a multi-layer substrate.

Furthermore, each of the plurality of antennas 1110a to 1110d disposed inside the electronic device 100 may be implemented as an array antenna. In this regard, the plurality of array antennas 1110a to 1110d are configurable to transmit or receive signals in a millimeter wave band (mmWave band).

Specifically, the plurality of antennas 1110a to 1110d disposed inside the electronic device 100 may be implemented as a one-dimensional array antenna or a two-dimensional array antenna.

When the plurality of antennas 1110a to 1110d are arranged as a one-dimensional array antenna, it may be referred to as an Mx1 array antenna, and beamforming can be made in one axial direction in which the plurality of antennas are disposed. In this regard, one axial direction in which the plurality of antennas are disposed may be a horizontal direction.

In another embodiment, when the plurality of antennas 1110a to 1110d are arranged as a one-dimensional array antenna, it may be referred to as an 1×N array antenna, and beamforming can be made in one axial direction in which the plurality of antennas are disposed. In this regard, one axial direction in which the plurality of antennas are disposed may be a vertical direction.

In a still another embodiment, when the plurality of antennas 1110a to 1110d are arranged as a two-dimensional array antenna, it may be referred to as an M×N array antenna. Meanwhile, beamforming can be made in a first axial direction in which a plurality of antennas are disposed and/or in a second axial direction orthogonal thereto. In this regard, the first axial direction in which the plurality of antennas are disposed may be a horizontal direction, and the second axial direction may be a vertical direction.

Referring to FIG. 3, the plurality of antennas 1110a to 1110d may be implemented as M×N array antennas to perform beam-forming in both a horizontal direction and/or a vertical direction. In this regard, the plurality of antennas 1110a to 1110d may be disposed on a front surface of the display or inside the electronic device.

Meanwhile, the plurality of antennas 1110a to 1110d according to the present disclosure may be disposed in a rotated state by a predetermined angle with respect to one another. Accordingly, there is an advantage in that the plurality of antennas 1110a to 1110d can be easily disposed with respect to one another and a level of mutual interference can be reduced. In FIG. 3, the plurality of antennas 1110a to 1110d are disposed in a substantially rotated state at an angle of 90 degrees to one another, but the present disclosure is not limited thereto and may be changed in various ways according to an application. For an example, the plurality of antennas 1110a to 1110d may be disposed in a substantially rotated state at an angle of 90 degrees to one another.

Specifically, the plurality of antennas 1110a to 1110d may be implemented as a 4×2 array antenna, but the number of antenna elements is not limited thereto, and may be changed in various ways according to an application.

Meanwhile, beam-forming may be independently performed through each of the array antennas 1110a to 1110d. Meanwhile, multi-input multi-output (MIMO) or diversity may be performed through a plurality of array antennas among the plurality of array antennas 1110a to 1110d.

Furthermore, a plurality of antennas 1110S1 and 1110S2 may be disposed on a side surface of the electronic device 100. Here, the number of the plurality of antennas 1110S1 and 1110S2 disposed on the side surface is not limited to two, but can be extended to four, six, eight or the like according to an application.

On the other hand, part of the plurality of antennas 1110S1 and 1110S2 disposed on the side surface may be implemented as array antennas in which a plurality of patch antennas are disposed to operate in a millimeter wave band. As an alternative, part of the plurality of antennas 1110S1 and 1110S2 disposed on the side surface may be implemented as a conductive member to operate in a 4G band or a 5G Sub6 band.

In addition, the antennas 1150B may be disposed on a rear surface of or inside the electronic device 100 toward the rear surface. Here, the number of antennas 1150B can be extended to two, four, six, eight or the like according to an application, like the number of the aforementioned plurality of antennas 1110a to 1110d.

For an example, for the antennas 1150B disposed inside of the electronic device 100 toward the rear surface may have a multi-layer substrate structure, antenna elements may be disposed at a rear side of the multi-layer substrate. Accordingly, by the antenna elements disposed at the rear side of the multi-layer substrate, the antennas 1150B may radiate signals toward the rear surface of the electronic device 100. In this regard, a dielectric material may be disposed on a rear region of the electronic device 100 from which signals are radiated by the antennas 1150B. Accordingly, while defining an exterior of the electronic device 100 as a metal case, it may be configured such that the dielectric material is disposed in some regions thereof.

In this regard, the antennas 1150B disposed inside of the electronic device 100 toward the rear surface may be configured with a plurality of array antennas. Accordingly, signals may be radiated toward the rear surface the electronic device 100 by the antennas 1150B disposed inside the electronic device 100 toward the rear surface.

Specifically, each of the plurality of array antennas 1150B may be configured as a mmWave antenna module. Here, the mmWave antenna module may be disposed on the rear surface, that is, back surface, of the electronic device 100, and may be disposed in a region other than a region where the battery/camera module/speaker module is disposed on the back surface.

On the other hand, referring to FIG. 2, a plurality of antennas ANT1 to ANT4 may be disposed on a front surface of the electronic device 100. Here, each of the plurality of antennas ANT1 to ANT4 may be configured as an array antenna to perform beamforming in a millimeter wave band. Each of the plurality of antennas ANT1 to ANT4 configured as a single antenna and/or a phased array antenna for use of a wireless circuit such as the transceiver circuit 250 is mounted on the electronic device 100.

Meanwhile, referring to FIGS. 2 and 3, at least one signal may be transmitted or received through the plurality of antennas 1110a to 1110d corresponding to the plurality of antennas ANT1 to ANT4. In this regard, each of the plurality of antennas 1110a to 1110d may be configured as an array antenna. The electronic device may communicate with a base station through any one of the plurality of antennas 1110a to 1110d. Alternatively, the electronic device may perform multi-input multi-output (MIMO) communication with the base station through two or more antennas among the plurality of antennas 1110a to 1110d.

Meanwhile, the present disclosure may transmit or receive at least one signal through the plurality of antennas 1110S1 and 1110S2 on a side surface of the electronic device 100. Unlike the drawings, at least one signal may be transmitted or received through the plurality of antennas 1110S1 to 1110S4 on a front surface of the electronic device 100. In this regard, each of the plurality of antennas 1110S1 to 1110S4 may be configured as an array antenna. The electronic device may communicate with a base station through any one of the plurality of antennas 1110S1 to 1110S4. Alternatively, the electronic device may perform multi-input multi-output (MIMO) communication with the base station through two or more antennas among the plurality of antennas 1110S1 to 1110S4.

On the other hand, in the present disclosure, at least one signal may be transmitted or received through the plurality of cone antennas 1110a to 1110d, 1150B, and 1110S1 to 1110S4 on a front surface and/or a side surface of the electronic device 100. In this regard, each of the plurality of antennas 1110a to 1110d, 1150B, and 1110S1 to 1110S4 may be configured as an array antenna. The electronic device may communicate with the base station through any one of the plurality of antennas 1110a to 1110d, 1150B, and 1110S1 to 1110S4. Alternatively, the electronic device may perform multi-input multi-output (MIMO) communication with the base station through two or more antennas among the plurality of antennas 1110a to 1110d, 1150B, and 111051 to 1110S4.

Hereinafter, an electronic device having a 5G antenna according to the present disclosure will be described. Specifically, an electronic device having an array antenna that is operable in a millimeter wave band and an electronic band gap (EBG) structure for improving its performance will be described.

In this regard, when a 5G mmWave array antenna is commercialized in earnest, it is expected that research on the performance improvement of the patch antenna will be more actively carried out. On the other hand, it is necessary to improve scan angle performance for antenna gain and beamforming by using a current array antenna structure without further increase in unit cost compared to the existing antenna. An electronic band gap (EBG) structure may be applied to improve the scan angle performance for antenna gain and beamforming.

On the other hand, there is a limit to the performance improvement of the EBGs disposed at regular intervals around the patch antenna as the same structure is repeated. In addition, this EBG structure has a problem of increasing an overall size of the antenna. Specifically, the EBG structure disposed at regular intervals around the patch antenna may have a limitation in improving antenna performance in the following aspects.

1) With regard to the EBG structure having the same periodic structure and shape, for an E-field of the patch antenna, the field generated from upper/lower sides of the antenna is different from that generated from left/right sides thereof. As a result, when the EBGs having the same structure are used for the upper/lower and left/right sides of the patch antenna, the performance of the EBGs cannot be maximized.

2) Accordingly, when this EBG structure is applied, the maximum gain has only a value of about 12 dBi even when a plurality of antenna elements are arranged. On the contrary, a hybrid EBG structure having different structures according to the present disclosure, which will be described below, has an advantage that the maximum gain can be improved to about 14.5 dBi.

3) With regard to scan angle, which is the core performance of 5G mmWave, an EBG structure having the same periodic structure and shape may generate an asymmetry of a radiation pattern due to interference between antenna elements. In addition, a sidelobe of the radiation pattern may increase due to the interference between the antenna elements. As a result, in the EBG structure having the same periodic structure and shape, scan performance according to beamforming may be deteriorated, and accordingly, scan angle may be limited. On the contrary, when the hybrid EBG structure having different structures according to the present disclosure, which will be described below, is used, interference between antenna elements may be reduced. As a result, scanning performance according to beamforming may be improved through different types of EBG structures at the upper/lower and left/right sides of the patch antenna, and accordingly, scan angle may be increased.

Therefore, the present disclosure proposes an EBG structure and arrangement form that improves the array antenna performance of 5G mmWave without changing an overall size of the antenna by newly designing an EBG structure having two different structures. Furthermore, the present disclosure also proposes a structure in which slots are defined in a ground layer for reducing a size of the EBG structure. As described above, slots may be defined in the ground layer to maximize the inductance, thereby reducing a size of the EBG structure.

Meanwhile, an aspect of the present disclosure according to the proposal of the present disclosure is to provide a structure design method for improving radiation efficiency and reducing a level of interference between antenna elements in a 5G antenna implemented on a multi-layer substrate.

Furthermore, another aspect of the present disclosure is to provide a structure design method for improving radiation efficiency and reducing a level of interference between antenna elements without additional cost in a multi-layer substrate on which a 5G antenna is disposed.

In addition, still another aspect of the present disclosure is to maximize antenna performance through the performance optimization of EBG structures while using the multi-layer substrate and a multi-layer substrate process for manufacturing the antenna as it is.

Moreover, yet still another aspect of the present disclosure is to improve antenna gain and scan angle performance, which are the most important performances in 5G mmWave.

Figure 4A:
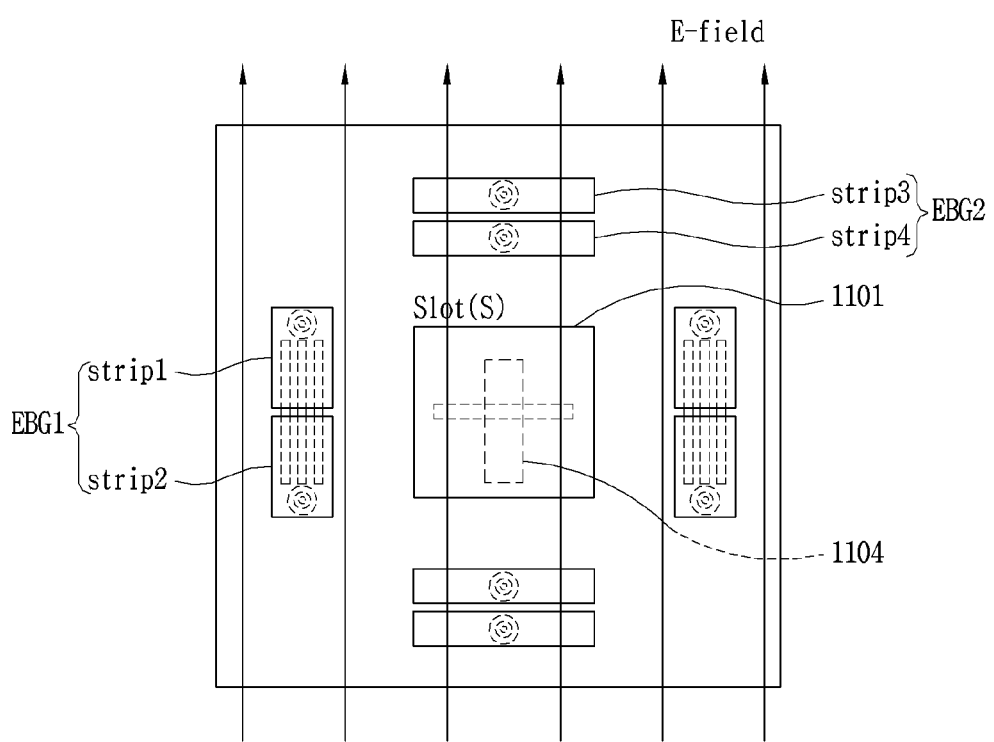
FIG. 4A shows a front view of an antenna and an EBG structure disposed therearound according to an embodiment. On the other hand.
Figure 4B:
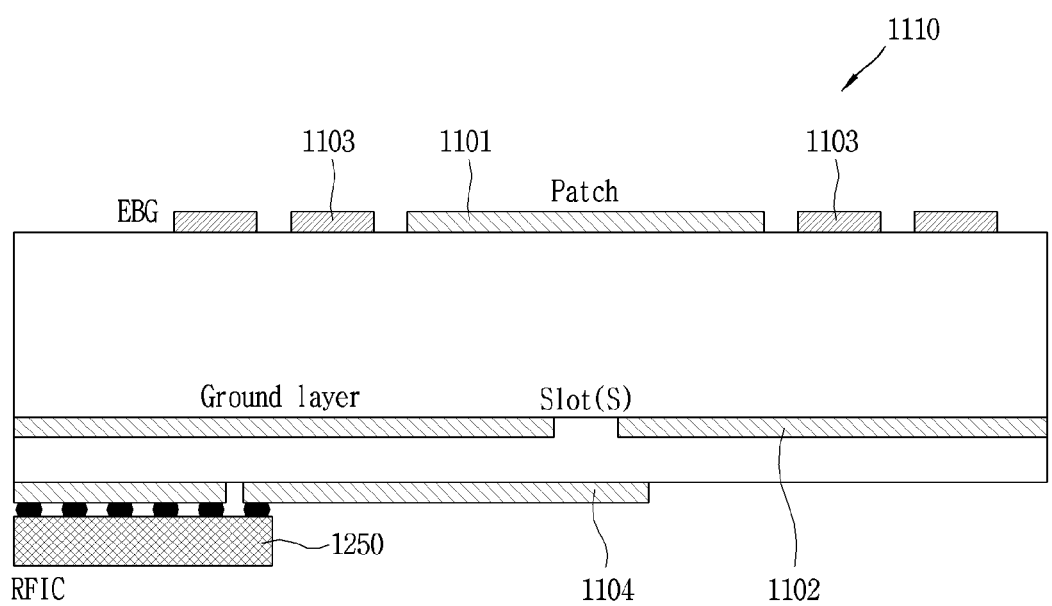
FIG. 4B shows a side view in which the antenna and the EBG structure disposed therearound are implemented in a multi-layer substrate according to an embodiment.

In this regard, FIG. 4A shows a front view of an antenna and an EBG structure disposed therearound according to an embodiment. On the other hand, FIG. 4B shows a side view in which the antenna and the EBG structure disposed therearound are implemented in a multi-layer substrate according to an embodiment.

Meanwhile, unlike FIG. 4A, when the EBG structures having the same shape are disposed around the patch antenna such that the EBG structures having the same shape surround the patch antenna, antenna radiation performance may be deteriorated. In this regard, an E-field distribution diagram formed by the patch antenna should suppress a surface wave by the EBG to radiate a signal to a free space. However, in the case of EBGs having the same structure, it may generate an unnecessary capacitance in a direction orthogonal to the E-field. Some E-fields are captured inside the antenna by the EBGs having such a capacitance component to store radiation energy that has been converted into capacitance. As such, the EBGs having such a capacitance component reduces the radiation performance of the antenna.

On the contrary, referring to FIG. 4A, a capacitance of the first EBG element EBG1 disposed in the same direction as an E-field direction of the antenna resonates with an inductance to form a high impedance. Accordingly, there is an advantage in that an E-field of the antenna is further radiated into a free space according to the first EBG element EBG1 disposed in the same direction as the E-field direction of the antenna. In particular, there is an advantage in that the E-field of the antenna is further radiated into a free space by a plurality of slots arranged in the ground region corresponding to the first EBG element EBG1.

Furthermore, for the second EBG element EBG2, as a plurality of metal strips are disposed adjacently, a capacitance component between the plurality of metal strips is formed in the same direction as the E-field direction of the antenna. Accordingly, there is an advantage in that an E-field of the antenna is further radiated into a free space according to the second EBG element EBG2 disposed in the same direction as the E-field direction of the antenna. In particular, there is an advantage in that the E-field of the antenna is further radiated into a free space due to the plurality of metal strips corresponding to the second EBG element EBG2 and vias located at the center portions of the metal strips.

Accordingly, referring to an E-field distribution diagram formed by the patch antenna 1101, EBG structures at upper/lower and left/right sides may be designed differently not to generate a capacitance in a direction orthogonal to the E-field. As a result, an unnecessary capacitance component for storing energy inside the antenna may not be generated, thereby improving antenna radiation performance.

Figure 5:
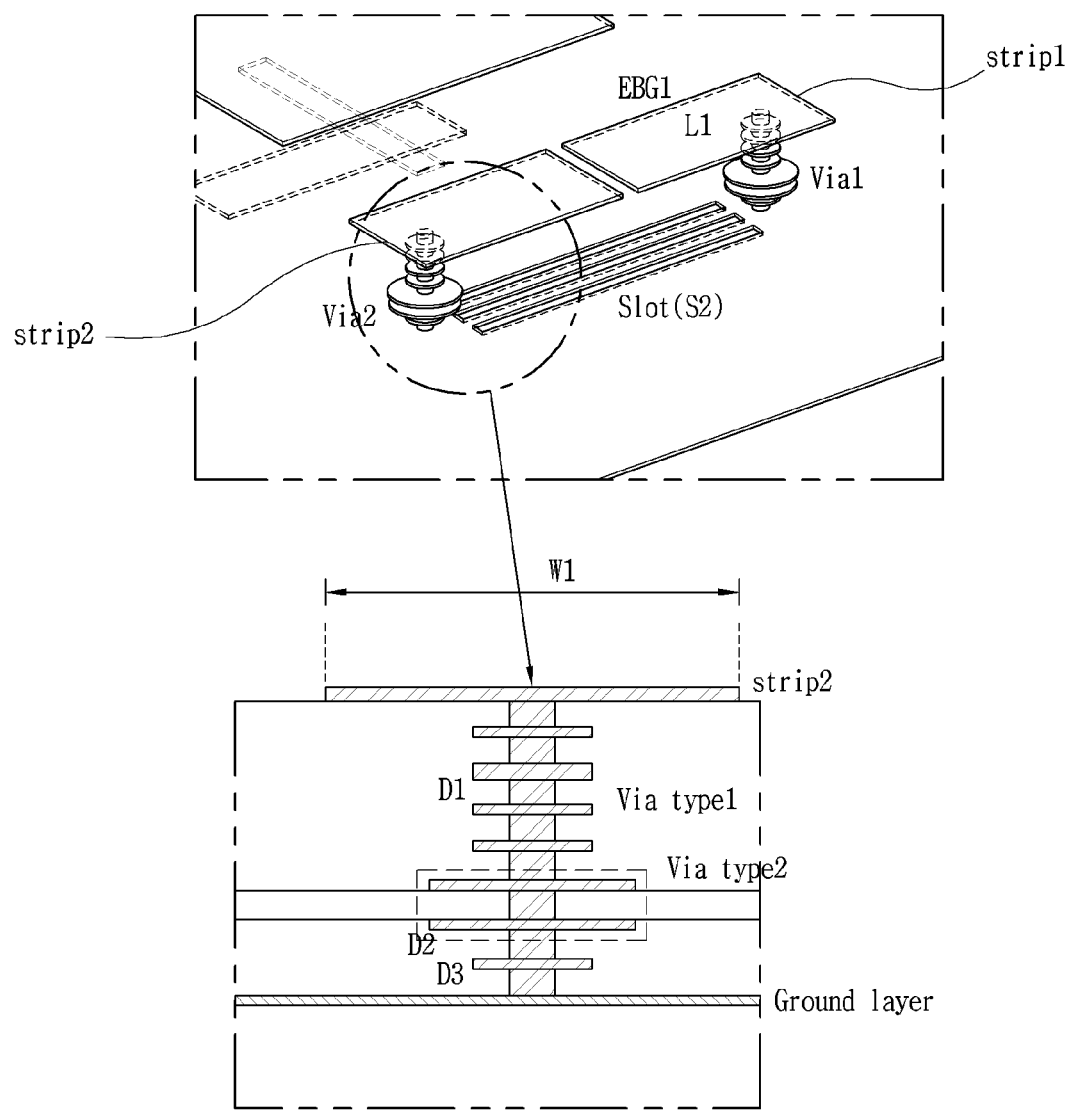
FIG. 5 shows a first type of EBG structure in the EBG structure according to an embodiment.
Figure 6:
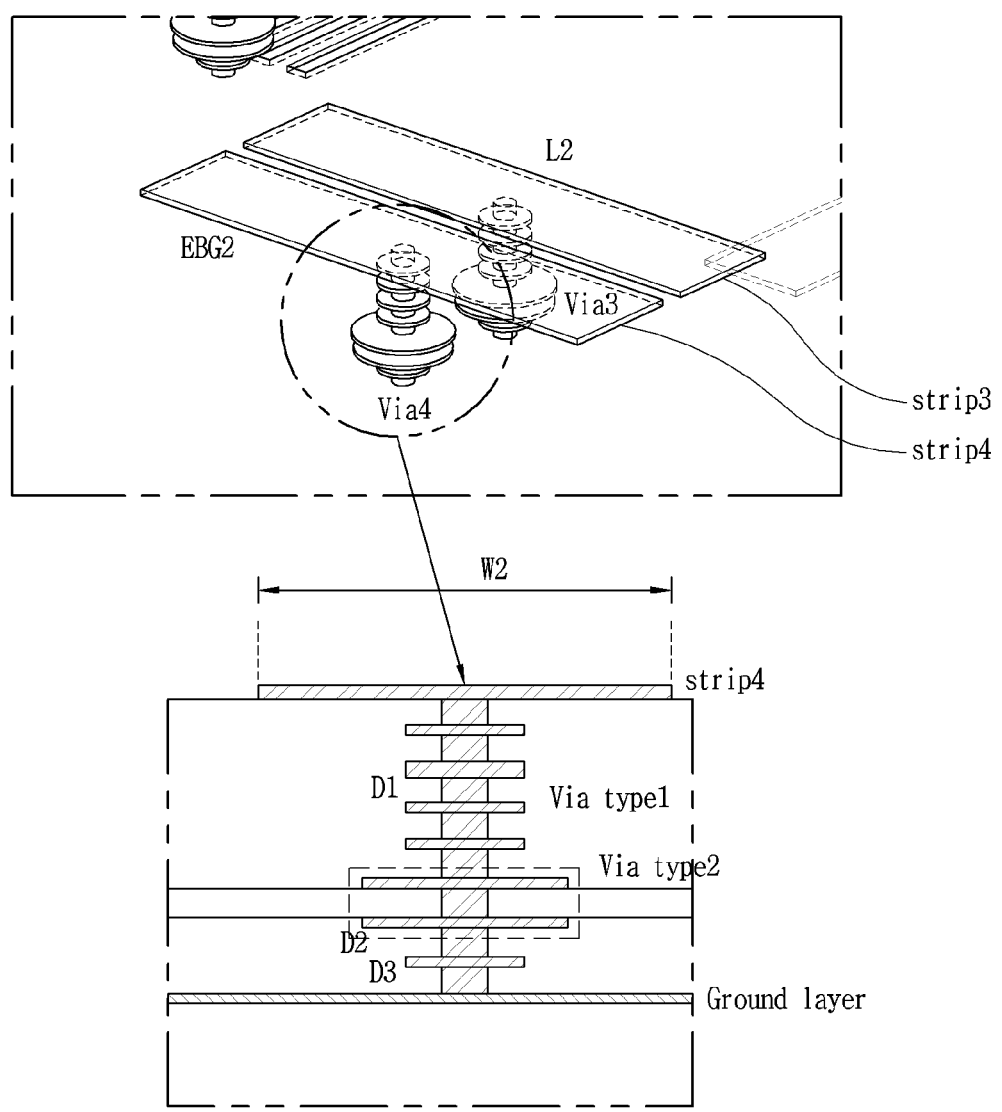
FIG. 6 shows a second type of EBG structure in the EBG structure according to an embodiment.

Meanwhile, FIG. 5 shows a first type of EBG structure in the EBG structure according to an embodiment. On the contrary, FIG. 6 shows a second type of EBG structure in the EBG structure according to an embodiment.

Figure 7:
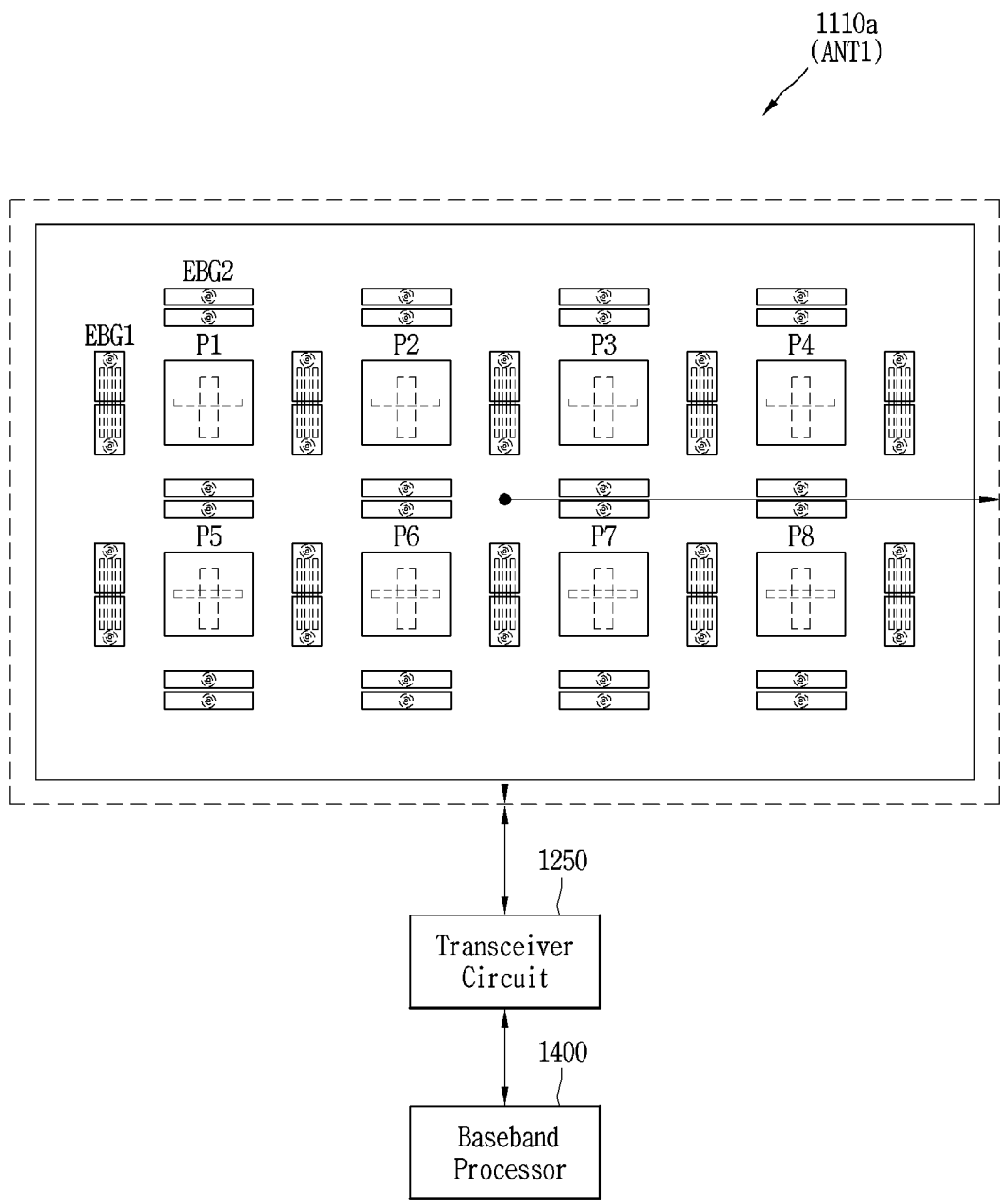
FIG. 7 shows an array antenna including a plurality of antenna elements on which the EBG structure according to FIGS. 4A to 6 is disposed and a configuration for controlling the same.

Meanwhile, FIG. 7 shows an array antenna including a plurality of antenna elements on which the EBG structure according to FIGS. 4A to 6 is disposed and a configuration for controlling the same.

FIGS. 3 to 7, the electronic device includes at least one array antenna 1110a to 1100d, a transceiver circuit 1250, and a baseband processor 1400.

The array antennas 1110a to 1100d are implemented as a multi-layer substrate inside the electronic device, and configured to include a plurality of antenna elements so as to form a beam in a specific direction. In this regard, each of the array antennas 1110a to 1100d may be disposed to be spaced apart from each other in different regions on a front surface of the display to perform multi-input multi-output (MIMO). In this case, each of the array antennas 1110a to 1100d may be disposed to be rotated by a predetermined angle, for example, 90 degrees, for improved isolation and optimal arrangement therebetween.

Meanwhile, each of the array antennas 1110a to 1100d may be configured as an M×N array antenna including a plurality of antenna elements in a two-dimensional space. For an example, as illustrated in FIGS. 3 and 7, it may be configured as a 4×2 array antenna. However, the present disclosure is not limited thereto, and each of the array antennas 1110a to 1100d may be configured as an M×1 or 1×N array antenna including a plurality of antenna elements in a one-dimensional space.

Meanwhile, the transceiver circuit 1250 is configured to control a signal applied to each antenna element of the array antennas 1110a to 1100d to perform beamforming through the array antennas 1110a to 1100d. For an example, the transceiver circuit 1250 may be implemented as a RFIC (Radio Frequency Integrated Chip) 1250. Specifically, the RFIC (Radio Frequency Integrated Chip) 1250, which is a processor, is connected to a feeding line 1104 in the form of bumping under the feeding line 1104 to transmit a millimeter wave band signal between the RFIC 1250 and the feeding line 1104.

Meanwhile, each antenna element constituting each of the array antennas 1110a to 1100d may include patch antennas 1101, P1 to P8 and a plurality of electronic band gap (EBG) elements 1103. In this regard, the plurality of EBG elements 1103 may include first and second EBGs EBG1, EBG2.

Accordingly, the first and second EBGs EBG1, EBG2 proposed in the present disclosure have a difference in that two types of EBGs having different EBG structures disposed at upper and lower sides and left and right sides of the antenna element are used. In addition, slots may be defined in the ground layer for reducing a size of the EBG structure. There is an advantage in that a size of the EBG structure can be reduced by defining slots in the ground layer to maximize the inductance as described above.

Meanwhile, the patch antennas 1101, P1 to P8 are arranged on a specific layer of the multi-layer substrate, and configured to radiate a signal applied from the feeding line 1104. The patch antennas 1101, P1 to P8 may be disposed on a front surface of an upper substrate, and the feeding line 1104 may be disposed on a rear surface of a lower substrate. A signal from the feeding line 1104 may be slot-coupled to the patch antennas 1101, P1 to P8 through a slot S of the ground layer.

The first EBG element EBG1 may be disposed at a left or right side of the patch antennas 1101, P1 to P8 in parallel to the patch antennas 1101, P1 to P8. Meanwhile, the second EBG element EBG2 may be disposed at an upper or lower side of the patch antennas 1101, P1 to P8 in parallel to the patch antennas 1101, P1 to P8. In this regard, an arrangement form of the second EBG element EBG2 may be different from that of the first EBG element EBG1. In addition, a width W1 and a length L1 of a metal strip constituting the first EBG element EBG1 may be set to be different from a width W2 and a length L2 of a metal strip constituting the second EBG element EBG2. Accordingly, the first EBG element EBG1 and the second EBG element EBG2 may be configured to both have different arrangement regions and forms.

Meanwhile, the first EBG element EBG1 may be configured to include a first metal strip strip1 and a second metal strip strip2. The first metal strip strip1 may be spaced apart from the patch antenna by a predetermined spacing at a left or right side of the patch antennas 1101, P1 to P8 and disposed in parallel thereto. On the contrary, the second metal strip strip2 may be spaced apart from the patch antenna by a predetermined spacing at the left or right side of the patch antennas 1101, P1 to P8 and disposed in parallel thereto.

Furthermore, the second EBG element EBG2 may be configured to include a third metal strip strip3 and a fourth metal strip strip4. The third metal strip strip3 may be disposed be spaced apart from the patch antenna by a predetermined spacing at an upper or lower side of the patch antennas 1101, P1 to P8 and disposed in parallel thereto. On the contrary, the fourth metal strip strip4 may be spaced apart from the third metal strip strip3 at an upper or lower side of the patch antennas 1101, P1 to P8 and disposed in parallel thereto.

In this regard, the third metal strip strip3 and the fourth metal strip strip4 may be disposed adjacent to each other to generate an interaction between a field formed on the third metal strip strip3 and a field formed on the fourth metal strip strip4. For example, a spacing between the third metal strip strip3 and the fourth metal strip strip4 may be disposed to be narrower than that between the patch antennas 1101, P1 to P8 and the third metal strip strip3.

Meanwhile, the first EBG element EBG1 and the second EBG element EBG2 may be implemented on the multi-layer substrate to connect different layers of the multi-layer substrate to each other. Specifically, the first EBG element EBG1 may include a plurality of vias Via1, Via2 configured to connect an upper layer on which the patch antenna is disposed and a ground layer of the multi-layer circuit substrate. Furthermore, the second EBG element EBG2 may include a plurality of vias Via3, Via4 configured to connect the upper layer on which the patch antenna is disposed and the ground layer of the multi-layer circuit substrate.

In this regard, the first EBG element EBG1 may include a plurality of slots S2 in the ground layer, and thus the plurality of vias Via1, Via2 may be connected to end portions of the metal strips. That is, the plurality of vias Via1, Via2 disposed in the first EBG element EBG1 may be disposed on end portions of the first metal strip strip1 and the second metal strip strip2. On the contrary, the plurality of vias Via3, Via4 of the second EBG element EBG2 may be connected to center points of the metal strips. That is, the plurality of vias Via3, Via4 disposed in the second EBG element EBG2 may be disposed on center portions of the third metal strip strip3 and the fourth metal strip strip4.

Meanwhile, a diameter D2 of at least one via disposed in a layer adjacent to the ground layer among the plurality of vias of the first EBG element EBG1 may be defined to be larger than a diameter D1 of the other vias. Similarly, a diameter D2 of at least one via disposed in a layer adjacent to the ground layer among the plurality of vias of the second EBG element EBG2 may be defined to be larger than a diameter D1 of the other vias.

Meanwhile, a diameter D3 of a via closest to the ground layer of the first EBG elements EBG1 may be defined to be smaller than a diameter D2 of an upper via thereof. In this regard, a via defined under the metal strip to have a diameter of D1 may be referred to as a first type via (Via type1). On the other hand, a via disposed under the first type via (Via type1) to have a diameter of D2 greater than D1 may be referred to as a second type via (Via type2).

Furthermore, a via disposed between the second type via (Via type2) and the ground layer to have a diameter of D3 may be further disposed. In this case, the diameter D3 of the via may be set to a value smaller than D2 in order to reduce field discontinuity between the second type via (Via type2) and the ground. In order to reduce design complexity while reducing field discontinuity, the diameter D3 of the via may be set to the same value as the diameter D1 of the first type via (Via type1).

Meanwhile, a diameter of the via having the largest diameter among the plurality of vias of the first EBG element EBG1 and the second EBG element EBG2 may be defined to be smaller than a width of each metal strip constituting the first EBG element and the second EBG element. In this regard, the vias disposed in the first EBG element EBG1 and the second EBG element EBG2 are to reduce an interference between the patch antennas 1101, P1 to P8 while improving antenna efficiency. Accordingly, the first EBG element EBG1 and the second EBG element EBG2 must prevent only a field generating inter-patch antenna interference from being transmitted to an adjacent patch antenna. That is, the first EBG element EBG1 and the second EBG element EBG2 must not interfere with a field radiated from the patch antenna to allow the patch antenna to effectively radiate a signal. To this end, a diameter of the via having the largest diameter among the plurality of vias of the first EBG element EBG1 and the second EBG element EBG2 may be defined to be smaller than a width of each metal strip constituting the first EBG element and the second EBG element.

Meanwhile, the ground layer corresponding to a region in which the first EBG element EBG1 is disposed may include a plurality of slots S2 having a specific length and width, which are spaced apart from each other by a predetermined distance. In this regard, the first EBG element EBG1 is disposed in the same direction as an electric field (E-field) formed in the patch antennas 1101, P1 to P8. Accordingly, a plurality of slots S2 may be arranged in the ground layer below a region in which the first EBG element EBG1 disposed in the same direction as the electric field (E-field) formed on the patch antennas 1101, P1 to P8 is disposed.

In the above, the 5G antenna having the first and second EBG elements EBG1, EBG2 according to the present disclosure has been described. In this regard, description focusing on matters to be claimed in the 5G antenna having the first and second EBG elements EBG1, EBG2 will be given as follows.

1) The present disclosure relates to the performance improvement of a mmWave antenna through a patch antenna and two different types of EBG structures.
2) The patch antenna may be configured as a single layer or multi-layer type.
3) The feeding method includes an indirect feeding method using coupling or a direct feeding method using vias.
4) EBG structures are disposed at upper/lower and left/right sides of the patch antenna.
5) The EBGs at the upper/lower sides of the patch antenna have the same structure and may be mirrored to each other.
6) The EBGs at the left/right sides of the patch antenna have the same structure and may be mirrored to each other.
7) The designs of EBG structures at the upper/lower sides and the left/right sides for an effectively operation are different from each other since distributions of E-fields generated at the upper/lower and left/right sides of the patch antenna are different from each other.
8) A via may be connected to the ground at the center of a patch surface of the EBG, but may also be connected to an end portion thereof to increase a capacitance to reduce an overall size of the EBG structure.
9) Although there may be no slot on a ground plane connected to an EBG via, there may be one or more slots on the ground to increase inductance to reduce an overall size of the EBG structure.
10) A size of each via pad in the multi-layer PCB may be different to increase a capacitance.

On the other hand, referring to FIGS. 5 and 6, an EBG structure for improving antenna performance, such as the first and second EBG elements EBG1, EBG2 according to the present disclosure, has the following structural features in relation to the matters to be claimed.

1) The EBG structure is configured with a patch surface at the top, a ground surface at the bottom, and vias connecting the top and bottom.
2) The vias may be connected vertically, and may be connected from the top to the bottom in a zig-zag form to reduce unwanted radiation at a specific frequency.
3) With regard to the vias of the PCB multi-layer, via pads may be disposed for electrical connection of vias in each layer.
4) Sizes of at least one via pad among the plurality of via pads may be different from each other in order to adjust a capacitance value.

Meanwhile, each of the antenna elements 1110, P1 to P8 constituting the array antenna is configured to include the slot region S and the feeding line 1104. In this regard, the slot region S is configured to transmit a signal from the feeding line 1104 by removing the ground from the ground layer 1102 of the multi-layer substrate corresponding to the center portion of the patch antennas 1101, P1 to P8. In addition, the feeding line 1104 is defined as a metal line having a predetermined length and width, and configured to couple a signal to the patch antennas 1101, P1 to P8 through the slot region S.

Meanwhile, the first EBG element EBG1 and the second EBG element EBG2 according to the present disclosure may be disposed to surround the patch antennas 1101, P1 to P8. As a result, a surface wave flowing along the dielectric from the patch antennas 1101, P1 to P8 may be reduced to improve antenna efficiency and reduce antenna interference. That is, as the surface wave flowing along the dielectric from the patch antennas 1101, P1 to P8 is reduced, a rate at which a signal from the patch antennas 1101, P1 to P8 is radiated into a free space will be increased. As the surface wave flowing along the dielectric is reduced as described above, there is an advantage in that it is possible to reduce antenna interference as well as to improve antenna efficiency.

To this end, the first EBG elements EBG1 may be disposed at both left and right sides of the patch antennas 1101, P1 to P8. In addition, the second EBG elements EBG2 may be disposed at both upper and right sides of the patch antennas 1101, P1 to P8. Meanwhile, in order to effectively reduce a surface wave flowing along a dielectric, the first EBG element EBG1 and the second EBG element EBG2 may be implemented on a multi-layer substrate. In this case, the patch antennas 1101, P1 to P8 and the feeding line 1104 may be disposed on different layers of the multi-layer substrate.

Specifically, the feeding line 1104 that supplies a signal to the patch antennas 1101, P1 to P8 may be disposed under the ground layer 1102 of the multi-layer substrate. In this case, the signal transmitted through the feeding line 1104 may be coupled to the patch antennas 1101, P1 to P8 through the slot region S defined in the ground layer 1102.

Meanwhile, referring to FIGS. 3 and 7, the array antennas 1110a to 1110d may be configured as a two-dimensional array antenna in which M antenna elements in one axial direction and N antenna elements less than the M in the other axial direction are disposed. As illustrated in FIGS. 3 and 7, the array antennas 1110a to 1110d may be configured as a 4×2 antenna, which is a two-dimensional array antenna in which four antenna elements in one axial direction and two antenna elements in the other axis direction are disposed.

In this regard, the present disclosure is not limited thereto, the array antenna 1100 may be configured with a one-dimensional array antenna such that a predetermined number of antenna elements are disposed in one axial direction to perform beamforming in the one axial direction. For an example, the one-dimensional array antenna may be configured as a 4×1 antenna.

For an example, the array antennas 1110a to 1110d according to the present disclosure may be configured as a two-dimensional array antenna to perform one-dimensional beamforming. In this case, the array antennas 1110a to 1110d according to the present disclosure may be configured as a 4×2 antenna that is a two-dimensional array antenna to perform one-dimensional beamforming in a horizontal or vertical plane.

The one-dimensional array antenna may be provided with vias disposed on end portions of the first metal strip and the second metal strip in an axial direction in which the array antenna is disposed. For an example, the first metal strip and the second metal strip may be disposed at substantially the same spacing from adjacent patch antennas. Specifically, the first metal strip and the second metal strip defined between the patch antennas P1, P2 may be disposed at center points at substantially the same spacing from the adjacent patch antennas P1, P2. In this regard, with respect to the meaning of "substantially", the meaning of "substantially the same spacing" includes a range that can be considered equal to the same spacing. Specifically, the EBG elements disposed between adjacent patch antennas includes the same distance from each adjacent antenna or a distance that can be considered to be the same.

As a result, the first EBG element EBG1 may be disposed in the same direction as an electric field formed in the patch antennas P1 to P8 to reduce a level of interference between the patch antennas P1 to P8 while improving antenna efficiency.

Meanwhile, in the two-dimensional array antenna, the first EBG element EBG1 having vias may be disposed on end portions of the first metal strip and the second metal strip in one axial direction. For an example, the first metal strip and the second metal strip may be disposed at substantially the same spacing from adjacent patch antennas. Specifically, the first metal strip and the second metal strip defined between the patch antennas P1, P2 may be disposed at center points at substantially the same spacing from the adjacent patch antennas P1, P2.

Accordingly, the first EBG element EBG1 is disposed in the same direction as electric fields formed in the patch antennas P1 to P8 to reduce a level of interference between the patch antennas P1 to P8 while improving antenna efficiency. In this regard, FIG. 8 shows a radiation pattern of an array antenna according to an embodiment.

Figure 8:
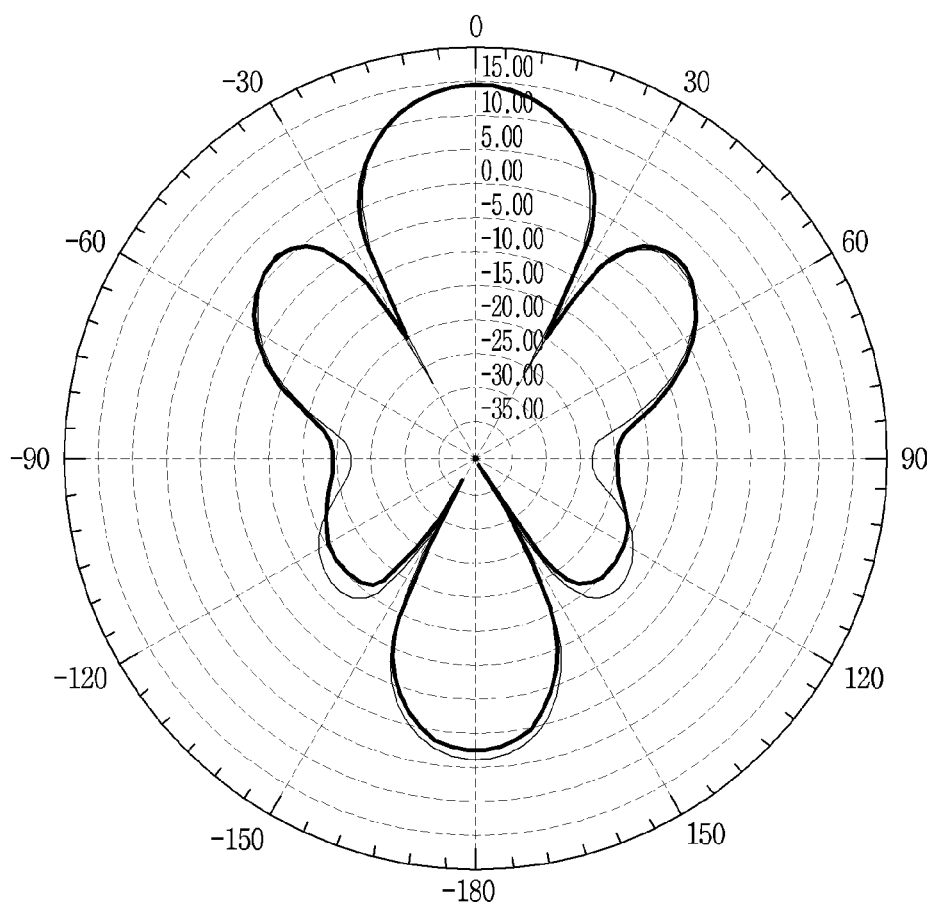
FIG. 8 shows a radiation pattern of an array antenna according to an embodiment.

Referring to FIG. 8, when both the first and second EBG elements EBG1, EBG2 are used, a radiation pattern is shown in a plane having an azimuth angle of 90 degree in a 4×2 array antenna. That is, a radiation pattern is shown in an axial direction in which two antenna elements are disposed in a 4×2 array antenna. On the other hand, the radiation pattern of FIG. 8 shows a radiation pattern in a plane having an azimuth angle of 90 degrees in an ×2 array antenna operating in a frequency band of 28 GHz.

When both the first and second EBG elements EBG1, EBG2 are used, the 4×2 array antenna has a gain of about 14.19 dB and a beam width of about 24.48 degrees. In particular, if the spacing between the first and second EBG elements EBG1, EBG2 and the patch antenna is optimized, the 4×2 array antenna has a gain of about 14.45 dB and a beam width of about 24.61 degrees. In the array antenna in which both the first and second EBG elements EBG, EBG2 according to the present disclosure are used, it can be seen that nulls in the radiation pattern are clearly formed due to improved antenna efficiency and reduced interference between antennas.

On the contrary, when a general EBG structure, for example, a periodic EBG structure having a predetermined form is used around the antenna element, the 4×2 array antenna has a gain of about 12.0 dB, and the beam width may also increase due to an interference between the antenna elements. In addition, in an array antenna using a general EBG structure, a radiation pattern may be asymmetrical or a null radiation pattern may not be formed due to an interference between antennas along with a decrease in antenna efficiency.

On the other hand, referring to FIGS. 3 and 7, in the two-dimensional array antenna, the second EBG element EBG2 having vias may be further disposed in the center portions of the third metal strip and the fourth metal strip in the other axial direction. As described above in this regard, the first EBG element EBG1 in which a plurality of vias are disposed on end portions of the first metal strip and the second metal strip in an axial direction in which the array antenna is disposed may be disposed. On the other hand, the third metal strip of the second EBG element EBG2 may be disposed to be spaced apart from the patch antenna by a predetermined spacing, and the fourth metal strip may be disposed to be spaced apart from the third metal strip by a spacing less than the predetermined spacing.

Meanwhile, the baseband processor 1400 is connected to the transceiver circuit 1250, and is configured to control the transceiver circuit 1250. Specifically, the baseband processor 1400 is configured to perform beamforming and multi-input multi-output (MIMO) through the plurality of array antennas 1100a to 1110d disposed at different positions of the electronic device. In this regard, the plurality of array antennas 1100a to 1110d or ANT1 to ANT4 are arranged in different arrangement forms in different regions of the electronic device to reduce a level of mutual interference during the MIMO operation.

Figure 9:
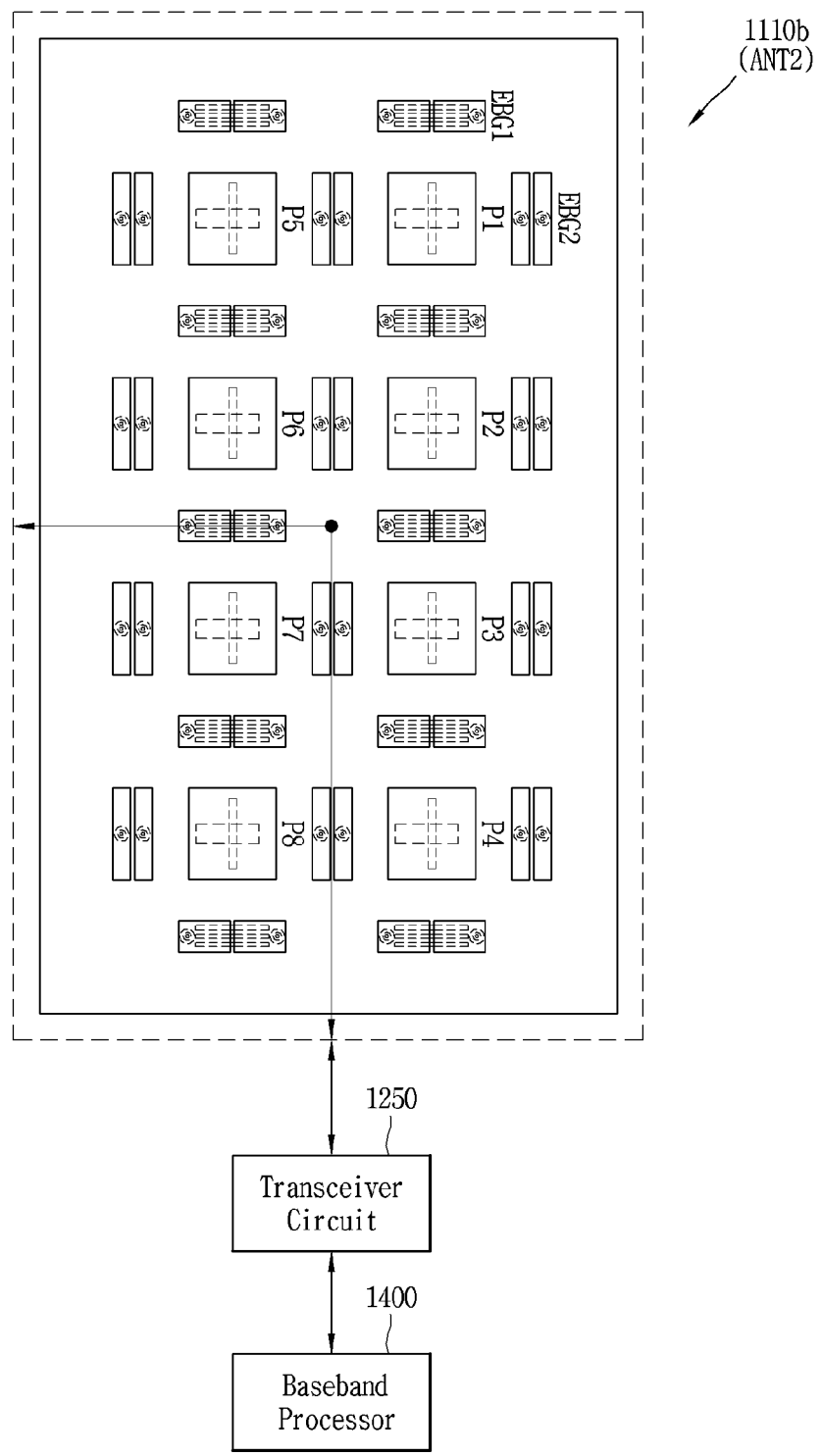
FIG. 9 shows an array antenna rotated at a predetermined angle and a circuit configuration connected thereto according to another embodiment.

In this regard, FIG. 9 shows an array antenna rotated at a predetermined angle and a circuit configuration connected thereto according to another embodiment. Meanwhile, FIG. 10 shows a plurality of different array antennas and a transceiver circuit and a baseband processor for controlling them according to an example.

Referring to FIGS. 3, 7, and 9, the second array antennas 1110b, ANT2 may be disposed to be rotated at a predetermined angle with respect to the first array antennas 1110a, ANT1. For an example, the second array antennas 1110b, ANT2 with respect to the first array antennas 1110a, ANT1 may be disposed to be rotated by a 90-degree angle.

Figure 10:
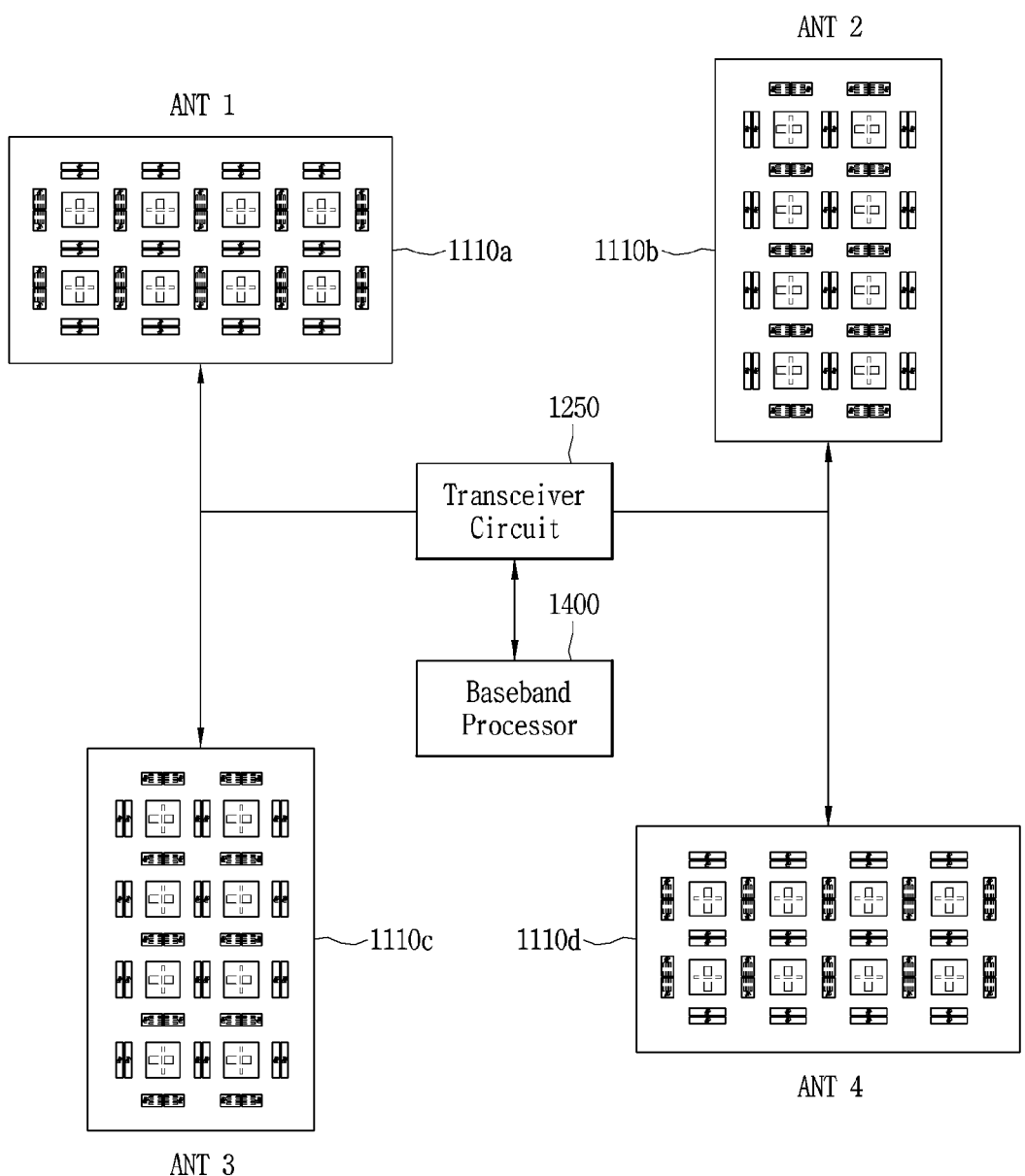
FIG. 10 shows a plurality of different array antennas and a transceiver circuit and a baseband processor for controlling them according to an example.

Meanwhile, referring to FIGS. 3 and 10, the plurality of array antennas may include the first array antenna 1110a, ANT1 to the fourth array antenna 1110d, ANT4 disposed at different positions of the electronic device in a state of being rotated by substantially 90 degrees to each other. Accordingly, the plurality of array antennas 1100a to 1110d or ANT1 to ANT4 are arranged in different arrangement forms in different regions of the electronic device to reduce a level of mutual interference during the MIMO operation. With regard to the meaning of "substantially", the meaning of "substantially 90 degrees" includes a 90-degree angle or a range that can be considered as a 90-degree angle. Specifically, the different array antennas 1110a to 1110d or ANT1 to ANT4 may be disposed in different regions in a state of being rotated by a 90-degree angle or in a range that can be considered as a 90-degree angle with respect to each other.

Meanwhile, when the quality of a first signal received through the first array antenna 1110a or ANT1 is less than or equal to a threshold value, the baseband processor 1400 may control a second signal to be received through another array antenna. In this regard, the baseband processor 1400 may control the transceiver circuit to receive a second signal through the second array antenna 1110b, ANT2 rotated by substantially 90 degrees with respect to the first array antenna 1110a, ANT1.

Meanwhile, the baseband processor 1400 may perform a MIMO operation through the first array antenna 1110a, ANT1 and the second array antenna 1110b, ANT2. During the MIMO operation, when the quality of the first signal or the second signal is less than or equal to the threshold value, the baseband processor 1400 may control the corresponding signal to be received through another array antenna. In this regard, when the quality of a first signal received through the first array antenna 1110a or ANT1 is less than or equal to a threshold value, the baseband processor 1400 may control the first signal to be received through another array antenna. For example, the baseband processor 1400 may control the first signal to be received through the third array antenna 1100c, ANT3 or the fourth array antenna 1100d, ANT4.

On the contrary, when the quality of the second signal received through the second array antenna 1110b or ANT2 is less than or equal to the threshold value, the baseband processor 1400 may control the second signal to be received through another array antenna. For example, the baseband processor 1400 may control the first signal to be received through the third array antenna 1100c, ANT3 or the fourth array antenna 1100d, ANT4.

On the other hand, referring to FIG. 10, each of the array antennas 1100a to 1100d or ANT1 to ANT4 may include a two-dimensional array antenna in which a predetermined number of antenna elements are disposed in one axial direction and a predetermined number of antenna elements are disposed in the other axial direction.

Meanwhile, in the array antenna according to the present disclosure, an electronic band gap (EBG) structure, which is a periodic grating structure for improving radiation performance, may be applied in different forms, that is, the first and second EBG elements EBG1, EBG2.

Meanwhile, the antenna element in which a plurality of via structures are disposed inside the patch according to the present disclosure according to FIGS. 1A to 10 and an array antenna using the same can be controlled by the baseband processor 1400. In this regard, the baseband processor 1400 is connected to the transceiver circuit 1250 to control the transceiver circuit 1250 so as to perform beamforming and multi-input multi-output (MIMO) through a plurality of array antennas 1100a to 1100d or ANT1 to ANT4 disposed at different positions of the electronic device.

In this regard, the plurality of array antennas 1100a to 1100d or ANT1 to ANT4 may be disposed inside the electronic device to radiate signals to a rear surface of the electronic device. As an alternative, the plurality of array antennas 1100a to 1100d or ANT1 to ANT4 may be disposed on a side surface of the electronic device to radiate signals to the side surface of the electronic device. As another alternative, the plurality of array antennas 1100a to 1100d or ANT1 to ANT4 may be implemented in the form of display antennas on a front surface of the electronic device to radiate signals to the front surface of the electronic device.

Meanwhile, the baseband processor 1400 may perform beamforming in different directions through the first array antenna ANT1 and the second array antenna ANT2 among the plurality of array antennas. In this case, the first array antenna ANT1 and the second array antenna ANT2 may be disposed to be rotated at a predetermined angle to each other to reduce a level of mutual interference, thereby improving MIMO characteristics. Accordingly, an isolation between the plurality of MIMO streams through the first array antenna ANT1 and the second array antenna ANT2 may be improved.

In the above, an electronic device having a 5G antenna according to the present disclosure has been described. In this regard, the technical effects of an electronic device having a 5G antenna employing an EBG structure for improving antenna radiation efficiency and reducing interference will be described as follows.

According to the present disclosure, through different types of EBG structures at upper/lower sides and left/right sides of the patch antenna, the electronic device may operate to optimize the directionality of an E-field formed in the patch antenna, thereby improving antenna gain and antenna scan angle.

Furthermore, according to the present disclosure, a surface wave generated along a surface of a dielectric around the patch antenna may be reduced to increase a signal component radiated to a free space, thereby improving antenna efficiency.

In addition, according to the present disclosure, interference between antennas may be reduced through different types of EBG structures to improve radiation pattern, thereby extending scan angle.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

Further scope of applicability of the present disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In connection to the foregoing present disclosure, a design of the array antenna including EBG structures and a control thereof may be implemented as computer-readable codes on a medium on which a program is recorded. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controllers 180, 1250, 1400 of the terminal. Therefore, it should also be understood that the above-described embodiments are not limited by any of the details of the foregoing description, unless otherwise specified, but rather should be construed broadly within its scope as defined in the appended claims. The scope of the invention should be determined by reasonable interpretation of the appended claims and all changes that come within the equivalent scope of the invention are included in the scope of the invention.

The invention claimed is:

1. An electronic device having an antenna, the electronic device comprising:
   an array antenna implemented as a multi-layer substrate inside the electronic device, the array antenna comprising a plurality of antenna elements; and
   a transceiver circuit that controls a signal applied to each antenna element of the array antenna to perform beamforming through the array antenna,
   wherein each of the antenna elements comprises:
   a patch antenna disposed on a specific layer of the multi-layer substrate and configured to radiate a signal applied from a feeding line;
   a first electronic band gap (EBG) element disposed in a same plane as the patch antenna at a left or right side of the patch antenna; and
   a second electronic band gap (EBG) element disposed in the same plane as the patch antenna at an upper or lower side of the patch antenna,
   wherein the first EBG element comprises:
   a first metal strip spaced apart from the patch antenna by a first predetermined spacing at the left or right side of the patch antenna and disposed in the same plane as the patch antenna; and
   a second metal strip spaced apart from the patch antenna by a second predetermined spacing at the left or right side of the patch antenna and disposed in the same plane as the patch antenna,
   wherein an arrangement form of the second EBG element is different from that of the first EBG element,
   wherein the first EBG element and the second EBG element comprise a plurality of vias configured to connect an upper layer on which the patch antenna is disposed and a ground layer of a multi-layer circuit substrate, and
   wherein a diameter of at least one via disposed in a layer adjacent to the ground layer among the plurality of vias is defined to be larger than those of the other vias.

2. The electronic device of claim 1, wherein the plurality of vias defined in the first EBG element are disposed on end portions of the first metal strip and the second metal strip.

3. The electronic device of claim 1, wherein the second EBG element comprises:
   a third metal strip spaced apart from the patch antenna by a predetermined spacing at an upper or lower side of the patch antenna and disposed in the same plane as the patch antenna; and
   a fourth metal strip spaced apart from the third metal strip at the upper or lower side of the patch antenna and disposed in the same plane as the patch antenna.

4. The electronic device of claim 3, wherein the plurality of vias defined in the first EBG element are disposed on center portions of the third metal strip and the fourth metal strip.

5. The electronic device of claim 1, wherein each of the antenna elements further comprises:
   a slot region from which a ground is removed in the ground layer of the multi-layer substrate corresponding to a central portion of the patch antenna; and
   a feeding line defined as a metal line having a predetermined length and width and configured to couple a signal to the patch antenna through the slot region.

6. The electronic device of claim 1, wherein the first EBG elements are disposed at both left and right sides of the patch antenna,
   wherein the second EBG element are disposed at both upper and right sides of the patch antenna, and
   wherein a feeding line that supplies a signal to the patch antenna is disposed under the ground layer of the multi-layer substrate, and a signal transmitted through the feeding line is coupled to the patch antenna through a slot region disposed in the ground layer.

7. The electronic device of claim 1, wherein the array antenna is configured as a one-dimensional array antenna such that a predetermined number of antenna elements are disposed in one axial direction to perform beamforming in the one axial direction, and configured with vias disposed on end portions of the first metal strip and the second metal strip in an axial direction in which the array antenna is disposed, and
   wherein the first metal strip and the second metal strip are disposed at substantially the same spacing from adjacent patch antennas.

8. The electronic device of claim 1, wherein the array antenna is configured as a two-dimensional array antenna in which M antenna elements in one axial direction and N antenna elements less than the M in the other axial direction are disposed,
   wherein the first EBG element having the vias is disposed on end portions of the first metal strip and the second metal strip in the one axial direction, and
   wherein the first metal strip and the second metal strip are disposed at substantially the same spacing from adjacent patch antennas.

9. The electronic device of claim 8, wherein in the array antenna, a second EBG element having vias is disposed in center portions of a third metal strip and a fourth metal strip in the other axial direction, and
   wherein the third metal strip is disposed to be spaced apart from the patch antenna by a predetermined interval, and the fourth metal strip is disposed to be spaced apart from the third metal strip by a spacing less than the predetermined interval.

10. The electronic device of claim 1, further comprising:
a baseband processor connected to the transceiver circuit and configured to control the transceiver circuit so as to perform beamforming and multi-input multi-output (MIMO) through a plurality of array antennas disposed at different positions of the electronic device.

11. The electronic device of claim 10, wherein the plurality of array antennas comprise first to fourth array antennas disposed at different positions of the electronic device in a state of being rotated by substantially 90 degrees with respect to each other, and
wherein when the quality of a first signal received through the first array antenna is less than or equal to a threshold value, the baseband processor controls the transceiver circuit to receive a second signal through a second array antenna rotated by substantially 90 degrees with respect to the first array antenna.

12. An electronic device having an antenna, the electronic device comprising:
an array antenna implemented as a multi-layer substrate inside the electronic device, the array antenna comprising a plurality of antenna elements; and
a transceiver circuit that controls a signal applied to each antenna element of the array antenna to perform beamforming through the array antenna,
wherein each of the antenna elements comprises:
a patch antenna disposed on a specific layer of the multi-layer substrate and configured to radiate a signal applied from a feeding line;
a first electronic band gap (EBG) element disposed in a same plane as the patch antenna at a left or right side of the patch antenna; and
a second electronic band gap (EBG) element disposed in the same plane as the patch antenna at an upper or lower side of the patch antenna,
wherein an arrangement form of the second EBG element is different from that of the first EBG element, and
wherein a diameter of a via having the largest diameter among the plurality of vias of the first EBG element EBG1 and the second EBG element EBG2 is defined to be smaller than a width of each metal strip constituting the first EBG element and the second EBG element.

13. An electronic device having an antenna, the electronic device comprising:
an array antenna implemented as a multi-layer substrate inside the electronic device, the array antenna comprising a plurality of antenna elements; and
a transceiver circuit that controls a signal applied to each antenna element of the array antenna to perform beamforming through the array antenna,
wherein each of the antenna elements comprises:
a patch antenna disposed on a specific layer of the multi-layer substrate and configured to radiate a signal applied from a feeding line;
a first electronic band gap (EBG) element disposed in a same plane as the patch antenna at a left or right side of the patch antenna; and
a second electronic band gap (EBG) element disposed in the same plane as the patch antenna at an upper or lower side of the patch antenna,
wherein an arrangement form of the second EBG element is different from that of the first EBG element, and
wherein the ground layer corresponding to a region in which the first EBG element is disposed comprises a plurality of slots having a specific length and width, which are spaced apart from each other by a predetermined distance.

* * * * *